(12) United States Patent
Nishimura et al.

(10) Patent No.: US 7,297,461 B2
(45) Date of Patent: Nov. 20, 2007

(54) RADIATION SENSITIVE RESIN COMPOSITION

(75) Inventors: Isao Nishimura, Tokyo (JP); Tsutomu Shimokawa, Tokyo (JP); Makoto Sugiura, Tokyo (JP)

(73) Assignee: JSR Corporation, Tokyo (JP)

( * ) Notice: Subject to any disclaimer, the term of this patent is extended or adjusted under 35 U.S.C. 154(b) by 375 days.

(21) Appl. No.: 10/975,052

(22) Filed: Oct. 28, 2004

(65) Prior Publication Data

US 2005/0171226 A1 Aug. 4, 2005

(30) Foreign Application Priority Data

Oct. 28, 2003 (JP) ............................. 2003-367470

(51) Int. Cl.
*G03F 7/004* (2006.01)
*G03C 1/72* (2006.01)
(52) U.S. Cl. .................. 430/270.1; 522/111; 522/148; 522/59
(58) Field of Classification Search .................. 522/31, 522/59, 148, 109, 111; 525/100, 104; 430/270.1
See application file for complete search history.

(56) References Cited

U.S. PATENT DOCUMENTS

| | | | |
|---|---|---|---|
| 4,910,122 A | 3/1990 | Arnold et al. | |
| 5,215,857 A | 6/1993 | Hosaka et al. | |
| 5,238,774 A | 8/1993 | Hosaka et al. | |
| 5,405,720 A | 4/1995 | Hosaka et al. | |
| 5,925,492 A | 7/1999 | Hosaka et al. | |
| 6,020,104 A | 2/2000 | Hosaka et al. | |
| 6,146,793 A | 11/2000 | Schaedeli et al. | |
| 6,165,682 A | 12/2000 | Foster et al. | |
| 6,207,728 B1 * | 3/2001 | Sekiguchi et al. | 522/83 |
| RE37,179 E | 5/2001 | Yamachika et al. | |
| 6,228,554 B1 | 5/2001 | Hosaka et al. | |
| 6,270,939 B1 | 8/2001 | Hosaka et al. | |
| 6,280,900 B1 | 8/2001 | Chiba et al. | |
| 6,337,171 B1 | 1/2002 | Kobayashi et al. | |
| 6,403,280 B1 | 6/2002 | Yamahara et al. | |
| 6,482,568 B1 | 11/2002 | Douki et al. | |
| 6,506,537 B2 | 1/2003 | Kobayashi et al. | |
| 6,531,260 B2 * | 3/2003 | Iwasawa et al. | 430/270.1 |
| 6,623,907 B2 | 9/2003 | Numata et al. | |
| 6,692,887 B1 | 2/2004 | Suwa et al. | |
| 6,727,032 B1 | 4/2004 | Suwa et al. | |
| 6,753,124 B2 | 6/2004 | Nishimura et al. | |
| 6,800,414 B2 | 10/2004 | Nishimura et al. | |

(Continued)

FOREIGN PATENT DOCUMENTS

EP        1 679 314 A1 * 12/2006

(Continued)

OTHER PUBLICATIONS

Jung et al., 1999, *J. Photopolym. Sci. Technol.*, 12(4):561-570, "ArF Single Layer Resist Composed of Alicyclic Main Chain Containing Anhydride".

(Continued)

*Primary Examiner*—Susan Berman
(74) *Attorney, Agent, or Firm*—Merchant & Gould, P.C.; Christopher W. Raimund

(57) ABSTRACT

A radiation-sensitive resin composition comprising (A) a resin containing a structural unit of the following formula (I), (B) a resin containing a recurring unit of the following formula (II), and (C) a photoacid generator,

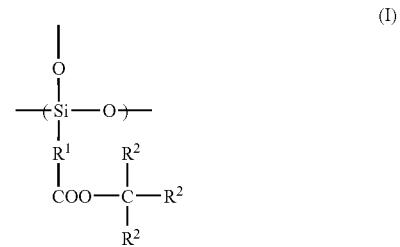

wherein $R^1$ represents a substituted or unsubstituted divalent (alicyclic) hydrocarbon, $R^2$ represents a lower alkyl group or a monovalent (substituted) alicyclic hydrocarbon group, or any two $R^2$s form in combination a divalent (substituted) alicyclic hydrocarbon group, with the remaining $R^2$ being a lower alkyl group or a monovalent (substituted) alicyclic hydrocarbon group,

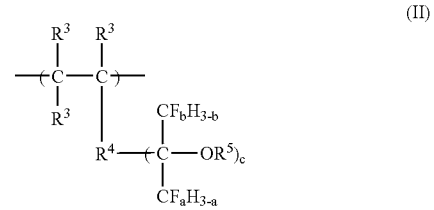

wherein $R^3$ represents a hydrogen atom, fluorine atom, or trifluoromethyl group, $R^4$ represents a (substituted) hydrocarbon group with a valence of (c+1), (substituted) alicyclic hydrocarbon with a valence of (c+1), or (substituted) aromatic group with a valence of (c+1), $R^5$ represents a hydrogen atom or a monovalent acid-dissociable group, a and b individually represent an integer of 0-3, provided that (a+b) ≧1 is satisfied, and c is an integer of 1-3. The radiation-sensitive resin composition has a high transparency at a wavelength of 193 nm or less and is particularly excellent in LER.

26 Claims, No Drawings

U.S. PATENT DOCUMENTS

| | | |
|---|---|---|
| 6,800,419 B2 | 10/2004 | Soyano et al. |
| 6,821,705 B2 | 11/2004 | Nagai et al. |
| 6,830,870 B2 * | 12/2004 | Malik et al. ............. 430/270.1 |
| 6,838,225 B2 | 1/2005 | Nishimura et al. |
| 6,899,989 B2 | 5/2005 | Suzuki et al. |
| 6,933,094 B2 | 8/2005 | Miyaji et al. |
| 6,964,840 B2 | 11/2005 | Nishimura et al. |
| 7,108,955 B2 * | 9/2006 | Iwasawa et al. ......... 430/270.1 |
| 2003/0170561 A1 | 9/2003 | Iwasawa et al. |
| 2003/0203309 A1 | 10/2003 | Nishimura et al. |
| 2003/0219680 A1 | 11/2003 | Nishimura et al. |
| 2004/0048192 A1 | 3/2004 | Shima et al. |
| 2004/0072094 A1 | 4/2004 | Shima et al. |
| 2004/0143082 A1 * | 7/2004 | Iwasawa et al. ............... 528/25 |
| 2004/0146802 A1 | 7/2004 | Yamamoto et al. |
| 2005/0095527 A1 | 5/2005 | Yokoyama et al. |
| 2005/0158657 A1 | 7/2005 | Suzuki et al. |
| 2005/0171226 A1 | 8/2005 | Nishimura et al. |
| 2005/0214680 A1 | 9/2005 | Miyaji et al. |

FOREIGN PATENT DOCUMENTS

| | | |
|---|---|---|
| JP | 5-188598 | 7/1993 |
| JP | 5-323611 | 12/1993 |
| JP | 8-160623 | 6/1996 |
| JP | 11-60733 | 3/1999 |
| JP | 2000-221685 | 8/2000 |
| JP | 2000-221686 | 8/2000 |

OTHER PUBLICATIONS

Kunz et al., 1999, *SPIE*, 3678:13-23, "Outlook for 157-nm Resist Design".

Kunz et al., *J. Photopolym. Sci. Technol.*, 12(4): 561-569, 1999 "Outlook for 157-nm Resist Design".

* cited by examiner

RADIATION SENSITIVE RESIN COMPOSITION

BACKGROUND OF THE INVENTION

1. Field of the Invention

The present invention relates to a radiation sensitive resin composition comprising a specific siloxane resin and a specific fluorine-containing resin suitable for microprocessing using various types of radiation such as deep ultraviolet radiation, electron beams, and X-rays.

2. Description of Background Art

A recent strong demand for high density and highly integrated LSIs accelerates miniaturization of wiring patterns.

Using short wave rays in a lithographic process is one method for miniaturizing wiring patterns. In recent years, deep ultraviolet rays typified by a KrF excimer laser (wavelength: 248 nm), an ArF excimer laser (wavelength: 193 nm), or an $F_2$ excimer laser (wavelength: 157 nm), electron beams, X rays, and the like are being used in place of ultraviolet rays such as g-line (wavelength: 436 nm) and i-line (wavelength: 365 nm).

Novolac resins, poly(vinylphenol) resins, and the like have been conventionally used in resist compositions. However, because these resins exhibit strong absorbance at a wavelength of 193 nm due to inclusion of aromatic rings in the structure, a lithographic process by an ArF excimer laser, for example, using these resins cannot provide high accuracy corresponding to high photosensitivity, high resolution, and a high aspect ratio.

Therefore, a resin material for use in a resist, transparent to a wavelength of 193 nm or less, particularly to an ArF excimer laser (wavelength: 193 nm) or an $F_2$ excimer laser (wavelength: 157 nm), and exhibiting excellent dry etching resistance equivalent to or better than aromatic rings has been desired. A polysiloxane is one such polymer. R. R. Kunz et al. of the MIT have reported their research results showing excellent transparency of a siloxane polymer at a wavelength of 193 nm or less, particularly at 157 nm, commenting on superiority of this polymer as a resist material in a lithographic process using radiation with a wavelength of 193 nm or less (e.g. J. Photopolym. Sci. Technol., Vol. 12, No. 4, 1999, P. 561-570, SPIE, Vol. 3678 (1999), P. 13-23). Moreover, polysiloxane polymers are known to exhibit excellent dry etching properties. In particular, a resist containing polyorganosilsesquioxane having a ladder structure is known to possess high plasma resistance.

Several chemically amplified resist compositions using a siloxane polymer have also been reported. A radiation-sensitive resin composition comprising a polysiloxane having an acid-dissociable group such as a carboxylic acid ester group, phenol ether group, etc., on the side chain, bonded to a silicon atom via one or more carbon atoms has been disclosed (e.g. Japanese Patent Application Laid-open No. 323611/1993). However, this polysiloxane cannot provide high resolution if the acid-dissociable carboxylic acid groups on the side chain do not efficiently dissociate. If a large number of acid-dissociable groups dissociate, on the other hand, the curing shrinkage stress of the resist film increases, causing cracks and peels in the resist film.

A positive tone resist using a polymer in which the carboxyl group of poly(2-carboxyethylsiloxane) is protected with an acid-dissociable group such as a t-butyl group has also been disclosed (Japanese Patent Application Laid-open No. 160623/1996). Since this resist protects the carboxyl groups only insufficiently, it is difficult to develop the resist containing a large amount of carboxylic acid components remaining in the non-exposed area using a common alkaline developing solution.

A resist resin composition containing a polyorganosilsesquioxane having an acid-dissociable ester group has also been disclosed (e.g. Japanese Patent Application Laid-open No. 60733/1999). This polyorganosilsesquioxane is prepared by the addition reaction of an acid-dissociable group-containing (meth)acryl monomer to a condensation product of vinyl trialkoxysilane, γ-methacryloxypropyltrialkoxysilane, or the like. The resin has a problem of insufficient transparency to light with a wavelength of 193 nm or less due to unsaturated groups originating from a (meth)acrylic monomer remaining on the polymer side chains. The patent specification also describes a resist resin composition containing a polymer made by the esterification of polyhydroxycarbonylethylsilsesquioxane with t-butyl alcohol. This polymer also has the same problem as a resist as encountered by the polymer disclosed in Japanese Patent Application Laid-open No. 160623/1996 due to a low degree of carboxyl group protection.

More recently, Japanese Patent Applications Laid-open No. 2000-221685 and No. 2000-221686 have disclosed chemically amplified resists in which the resin component contains a siloxane-based resin or silicon-containing resin and a silicon-free resin, such as a resist containing a silsesquioxane polymer and a copolymer of 2-methyl-2-adamantyl methacrylate and mevalonic methacrylate or a resist containing a copolymer of p-hydroxystyrene and tris(trimethylsilyl)silyl methacrylate and a copolymer of p-hydroxystyrene and t-butyl methacrylate. The inventors of these patent applications claim that these chemically amplified resists excel in sensitivity, resolution, pattern-forming properties, dry etching resistance, and the like.

Most recently, due to progress of miniaturization of resist patterns LER (line-edge roughness) is being highlighted as an important property of chemically amplified resists, including the chemically amplified resist containing a siloxane polymer. A technology for decreasing the LER is strongly desired.

An object of the present invention is to provide a radiation-sensitive resin composition suitable for use particularly as a chemically-amplified resist exhibiting high transparency at a wavelength of 193 nm or less and excellent LER properties.

SUMMARY OF THE INVENTION

The above object can be achieved in the present invention by a radiation-sensitive resin composition comprising (A) a resin containing a structural unit of the following formula (I), (B) a resin containing a recurring unit of the following formula (II), and (C) a photoacid generator,

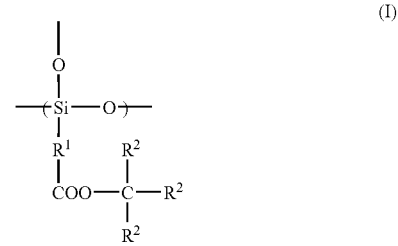

wherein $R^1$ represents a substituted or unsubstituted, linear or branched, divalent hydrocarbon group having 1-20 carbon atoms or a substituted or unsubstituted divalent alicyclic hydrocarbon group having 3-20 carbon atoms, $R^2$ individually represents a linear or branched alkyl group having 1-4 carbon atoms or a monovalent alicyclic hydrocarbon group having 4-20 carbon atoms or a substituted derivative thereof, or any two $R^2$s form in combination a divalent alicyclic hydrocarbon group having 4-20 carbon atoms or a substituted derivative thereof, with the remaining $R^2$ being a linear or branched alkyl group having 1-4 carbon atoms or a monovalent alicyclic hydrocarbon group having 4-20 carbon atoms or a substituted derivative thereof,

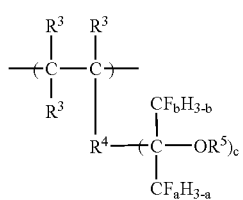

(II)

wherein $R^3$ individually represents a hydrogen atom, fluorine atom, methyl group, or a trifluoromethyl group, $R^4$ represents a linear or branched hydrocarbon group having 1-20 carbon atoms with a valence of (c+1), an alicyclic hydrocarbon group having 3-20 carbon atoms with a valence of (c+1), or an aromatic group having 6-20 carbon atoms with a valence of (c+1), or a group in which a —COO— group or —O— group is bonded to the linear or branched hydrocarbon group with a valence of (c+1), alicyclic hydrocarbon group with a valence of (c+1), or aromatic group with a valence of (c+1), provided that the carbonyl group in the —COO— group bonds to the main chain carbon atom in the formula (II), the linear or branched hydrocarbon group with a valence of (c+1), alicyclic hydrocarbon group with a valence of (c+1), or aromatic group with a valence of (c+1) being either substituted or unsubstituted, $R^5$ represents a hydrogen atom or a monovalent acid-dissociable group, a and b individually represent an integer of 0-3, provided that a and b satisfy the inequality of (a+b)≧1, and c is an integer of 1-3.

In the above radiation-sensitive resin composition, $R^1$ in the formula (I) representing a structural unit in the resin is preferably a group derived from bicyclo[2.2.1]heptane or tetracyclo[6.2.1.1$^{3,6}$.0$^{2,7}$]dodecane.

In the above radiation-sensitive resin composition, the structure for the group $C(R^5)_3$ in the formula (I) representing a structural unit in the resin is preferably one or more groups selected from the group consisting of a trialkylmethyl group, 1-alkylcycloalkyl group, alkyl-substituted bridged hydrocarbon group, or alkyl-substituted, bridged hydrocarbon-group substituted methyl group.

In the above radiation-sensitive resin composition, $R^4$ in the formula (II) representing a structural unit in the resin is preferably a group with a valence of (c+1) derived from methane, benzene, cyclohexane, or carboxybicyclo[2.2.1]heptane.

In the above radiation-sensitive resin composition, $R^5$ in the formula (II) representing a structural unit in the resin is preferably a hydrogen atom, t-butoxycarbonyl group, methoxymethyl group, or ethoxymethyl group.

In a preferred embodiment of the radiation-sensitive resin composition of the present invention, the resin of the component (A) further contains a structural unit of the following formula (III) and/or a structural unit of the following formula (IV):

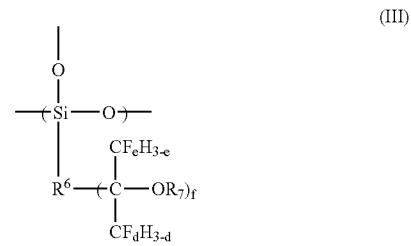

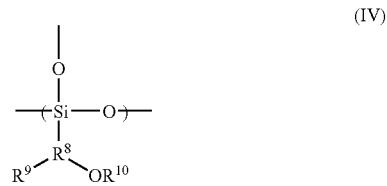

wherein $R^6$ represents a substituted or unsubstituted, linear or branched hydrocarbon group having 1-20 carbon atoms with a valence of (f+1) or a substituted or unsubstituted alicyclic hydrocarbon group having 3-20 carbon atoms with a valence of (f+1), $R^7$ represents a hydrogen atom or a monovalent acid-dissociable group, d and e individually represent an integer of 0-3, provided that d and e satisfy the inequality of (d+e)≧1, f is an integer of 1-3, $R^8$ represents a substituted or unsubstituted trivalent alicyclic hydrocarbon group having 3-20 carbon atoms or a substituted or unsubstituted trivalent heterocyclic group having 3-20 atoms, $R^9$ represents a hydrogen atom, fluorine atom, a linear or branched alkyl group having 1-4 carbon atoms, or a linear or branched fluoroalkyl group having 1-4 carbon atoms, and $R^{10}$ represents a hydrogen atom or a monovalent acid-dissociable group.

In the radiation-sensitive resin composition of the present invention, the resin of the component (A) preferably contains a structural unit of the above formula (III).

In the above radiation-sensitive resin composition, $R^6$ in the formula (III) representing a structural unit is preferably a group derived from cyclohexane, bicyclo[2.2.1]heptane, or tetracyclo[6.2.1.1$^{3,6}$.0$^{2,7}$]dodecane and $R^7$ is preferably a hydrogen atom, t-butoxycarbonyl group, methoxymethyl group, or ethoxymethyl group.

In a preferred embodiment of the radiation-sensitive resin composition of the present invention, the resin of the component (B) further contains a recurring unit of the following formula (V) and/or a recurring unit of the following formula (VI):

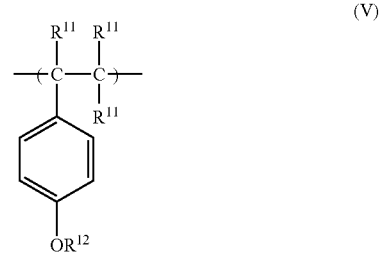

-continued

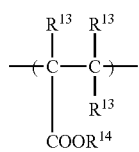
(VI)

wherein $R^{11}$ individually represents a hydrogen atom, fluorine atom, methyl group, or trifluoromethyl group and $R^{12}$ represents a hydrogen atom or a monovalent acid-dissociable group, $R^{13}$ individually represents a hydrogen atom, fluorine atom, or trifluoromethyl group and $R^{14}$ represents a hydrogen atom or a monovalent acid-dissociable group.

In the above radiation-sensitive resin composition, the acid generator (C) preferably comprises a compound generating trifluoromethane sulfonic acid or an acid of the following formula (3) (hereinafter referred to as "acid generator (C1)") upon exposure to light.

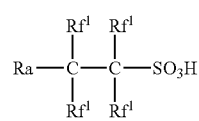
(3)

In the above radiation-sensitive resin composition, the acid generator (C) preferably comprises, in addition to the acid generator (C1), a compound generating an acid of the following formula (4), an acid of the following formula (5), or an acid of the following formula (6) upon exposure to light.

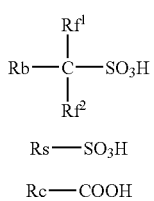
(4)

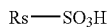
(5)

(6)

DETAILED DESCRIPTION OF THE INVENTION AND PREFERRED EMBODIMENTS

The present invention is described below in detail.

Siloxane Resin (A)

The component (A) (hereinafter referred to as "siloxane resin (A)") of the present invention is a resin having the structural unit of the above formula (I) (hereinafter referred to as "structural unit (I)"). As examples of the divalent linear or branched hydrocarbon group having 1-20 carbon atoms represented by $R^1$ in the formula (I), groups derived from methane, ethane, propane, butane, pentane, hexane, heptane, octane, nonane, decane, dodecane, tetradecane, hexadecane, octadecane, and eicosane can be given.

Of these divalent linear or branched hydrocarbon groups, a group originating from ethane, propane, butane, pentane, hexane, and the like are preferable.

As examples of the divalent alicyclic hydrocarbon group having 3-20 carbon atoms represented by $R^1$, groups derived from a cyclo alkane such as cyclobutane, cyclopentane, cyclohexane, cycloheptane, or cyclooctane and groups derived from a bridged hydrocarbon such as adamantane, bicyclo[2.2.1]heptane, tricyclo[5.2.1.0$^{2,6}$]decane, or tetracyclo[6.2.1.1$^{3,6}$.0$^{2,7}$]dodecane can be given.

Of these divalent alicyclic hydrocarbon groups, the groups derived from cyclopentane, cyclohexane, bicyclo[2.2.1]heptane, tetracyclo[6.2.1.1$^{3,6}$.0$^{2,7}$]dodecane, or the like are preferable.

As the $R^1$ group in the formula (I), the group derived from bicyclo[2.2.1]heptane, the group derived from tetracyclo[6.2.1.1$^{3,6}$.0$^{2,7}$]dodecane, or the like are particularly preferable.

As examples of the substituent for the divalent linear or branched hydrocarbon group or the divalent alicyclic hydrocarbon group represented by R1, a fluorine atom, hydroxyl group, carboxyl group, epoxy group, oxo group, amino group, cyano group, isocyanyl group, cyanyl group, (meth)acryloyl group, (meth)acryloyloxy group, perfluoroalkyl group having 1-4 carbon-atoms, hydroxyalkyl group having 1-4 carbon atoms, cyanoalkyl group having 2-5 carbon atoms, alkoxyl group having 1-4 carbon atom, alkylol group having 1-4 carbon atoms, alkoxymethyl group having 2-5 carbon atoms, alkoxycarbonyl group having 2-5 carbon atoms, alkoxycarbonylamino group having 2-5 carbon atom, alkoxysulfonyl group having 1-4 carbon atoms, and alkylaminosulfonyl group having 1-4 carbon atoms can be given.

Of these substituents, a fluorine atom, hydroxyl group, cyano group, perfluoroalkyl group having 1-4 carbon atoms, alkoxycarbonylamino group having 2-5 carbon atoms, and the like are preferable.

Any number of one or more types of these substituents may be present in the substituted derivatives.

As examples of the linear or branched alkyl group having 1-4 carbon atoms represented by $R^2$ in the formula (I), a methyl group, ethyl group, n-propyl group, i-propyl group, n-butyl group, 2-methylpropyl group, 1-methylpropyl group, and t-butyl group can be given.

Of these alkyl groups, a methyl group, ethyl group, and the like are preferable.

As examples of the monovalent alicyclic hydrocarbon group having 4-20 carbon atoms represented by $R^2$ or a divalent alicyclic hydrocarbon group having 4-20 carbon atoms formed by combination of any two $R^2$ groups, groups derived from a cycloalkane such as cyclobutane, cyclopentane, cyclohexane, cycloheptane, or cyclooctane and groups derived from a bridged hydrocarbon such as adamantane, bicyclo[2.2.1]heptane, tricyclo[5.2.1.0$^{2,6}$]decane, or tetracyclo[6.2.1.1$^{3,6}$.0$^{2,7}$]dodecane can be given.

Of these monovalent alicyclic hydrocarbon groups and divalent alicyclic hydrocarbon groups, the groups derived from cyclopentane, cyclohexane, adamantane, bicyclo[2.2.1]heptane, or the like are preferable.

As examples of the substituents for the substituted derivatives in the above monovalent or divalent alicyclic hydrocarbon group, the same substituents as those given for the divalent linear or branched hydrocarbon group or the divalent alicyclic hydrocarbon group represented by $R^1$ can be given.

Of these substituents, a hydroxyl group, carboxyl group, hydroxymethyl group, cyano group, cyanomethyl group, and the like are preferable.

Any number of one or more types of these substituents may be present in the substituted derivatives.

As examples of the structure represented by —C(R$^2$)$_3$ in the formula (I): trialkylmethyl groups such as a t-butyl group, 2-methyl-2-butyl group, 2-ethyl-2-butyl group, 3-methyl-3-butyl group, 3-ethyl-3-butyl group, and 3-methyl-3-pentyl group; 1-alkylcycloalkyl groups such as a 1-methylcyclopentyl group, 1-ethylcyclopentyl group, 1-n-propylcyclopentyl group, 1-methylcyclohexyl group, 1-ethylcyclohexyl group, and 1-n-propylcyclohexyl group; alkyl-substituted bridged hydrocarbon groups such as 2-methyladamantan-2-yl group, 2-methyl-3-hydroxyadamantan-2-yl group, 2-ethyladamantan-2-yl group, 2-ethyl-3-hydroxyadamantan-2-yl group, 2-n-propyladamantan-2-yl group, 2-n-butyladamantan-2-yl group, 2-methoxymethyladamantan-2-yl group, 2-methoxymethyl-3-hydroxyadamantan-2-yl group, 2-ethoxymethyladamantan-2-yl group, 2-n-propoxymethyladamantan-2-yl group, 2-methylbicyclo[2.2.1]heptan-2-yl group, 2-methyl-5-hydroxybicyclo[2.2.1]heptan-2-yl group, 2-methyl-6-hydroxybicyclo[2.2.1]heptan-2-yl group, 2-methyl-5-cyanobicyclo[2.2.1]heptan-2-yl group, 2-methyl-6-cyanobicyclo[2.2.1]heptan-2-yl group, 2-ethylbicyclo[2.2.1]heptan-2-yl group, 2-ethyl-5-hydroxybicyclo[2.2.1]heptan-2-yl group, 2-ethyl-6-hydroxybicyclo[2.2.1]heptan-2-yl group, 4-methyltetracyclo[6.2.1.1$^{3,6}$.0$^{2,7}$]dodecan-4-yl group, 4-methyl-9-hydroxytetracyclo[6.2.1.1$^{3,6}$.0$^{2,7}$]dodecan-4-yl group, 4-methyl-10-hydroxytetracyclo[6.2.1.1$^{3,6}$.0$^{2,7}$]dodecan-4-yl group, 4-methyl-9-cyanotetracyclo[6.2.1.1$^{3,6}$.0$^{2,7}$]dodecan-4-yl group, 4-methyl-10-cyanotetracyclo[6.2.1.1$^{3,6}$.0$^{2,7}$]dodecan-4-yl group, 4-ethyl tetracyclo[6.2.1.1$^{3,6}$.0$^{2,7}$]dodecan-4-yl group, 4-ethyl-9-hydroxytetracyclo[6.2.1.1$^{3,6}$.0$^{2,7}$]dodecan-4-yl group, 4-ethyl-10-hydroxytetracyclo[6.2.1.1$^{3,6}$.0$^{2,7}$]dodecan-4-yl group, 8-methyl tricyclo[5.2.1.0$^{2,6}$]decan-8-yl group, 8-methyl-4-hydroxytricyclo[5.2.1.0$^{2,6}$]decany-8-yl group, 8-methyl-4-cyanotricyclo[5.2.1.0$^{2,6}$]decan-8-yl group, 8-ethyltricyclo[5.2.1.0$^{2,6}$]decan-8-yl group, and 8-ethyl-4-hydroxytricyclo[5.2.1.0$^{2,6}$]decan-8-yl group; dialkylcycloalkylmethyl groups such as 1-methyl-1-cyclopentylethyl group, 1-methyl-1-(2-hydroxycyclopentyl)ethyl group, 1-methyl-1-(3-hydroxycyclopentyl)ethyl group, 1-methyl-1-cyclohexylethyl group, 1-methyl-1-(3-hydroxycyclohexyl)ethyl group, 1-methyl-1-(4-hydroxycyclohexyl)ethyl group, 1-methyl-1-cycloheptylethyl group, 1-methyl-1-(3-hydroxycycloheptyl)ethyl group, and 1-methyl-1-(4-hydroxycycloheptyl)ethyl group; alkyl-substituted bridged hydrocarbon group-substituted methyl group such as 1-methyl-1-(adamantan-1-yl)ethyl group, 1-methyl-1-(3-hydroxyadamantan-1-yl)ethyl group, 1-methyl-1-(bicyclo[2.2.1]heptan-2-yl)ethyl group, 1-methyl-1-(5-hydroxybicyclo[2.2.1]heptan-2-yl)ethyl group, 1-methyl-1-(6-hydroxybicyclo[2.2.1]heptan-2-yl)ethyl group, 4-methyl-1-(tetracyclo[6.2.1.1$^{3,6}$.0$^{2,7}$]dodecan-4-yl)ethyl group, 1-methyl-1-(9-hydroxytetracyclo[6.2.1.1$^{3,6}$.0$^{2,7}$]dodecan-4-yl)ethyl group, 1-methyl-1-(10-hydroxytetracyclo[6.2.1.1$^{3,6}$.0$^{2,7}$]dodecan-4-yl)ethyl group, 1-methyl-1-(tricyclo[5.2.1.0$^{2,6}$]decan-8-yl)ethyl group, and 1-methyl-1-(4-hydroxytricyclo[5.2.1.0$^{2,6}$]decan-8-yl)ethyl group; alkyl-dicycloalkylmethyl groups such as 1,1-dicyclopentylethyl group, 1,1-di(2-hydroxycyclopentyl)ethyl group, 1,1-di(3-hydroxycyclopentyl)ethyl group, 1,1-dicyclohexylethyl group, 1,1-di(3-hydroxycyclohexyl)ethyl group, 1,1-di(4-hydroxycyclohexyl)ethyl group, 1,1-dicycloheptylethyl group, 1,1-di(3-hydroxycycloheptyl)ethyl group, and 1,1-di(4-hydroxycycloheptyl)ethyl group; and alkyl-substituted di(bridged hydrocarbon group)-substituted methyl group such as 1,1-di(adamantan-1-yl)ethyl group, 1,1-di(3-hydroxyadamantan-1-yl)ethyl group, 1,1-di(bicyclo[2.2.1]heptan-2-yl)ethyl group, 1,1-di(5-hydroxybicyclo[2.2.1]heptan-2-yl)ethyl group, 1,1-di(6-hydroxybicyclo[2.2.1]heptan-2-yl)ethyl group, 1,1-di(tetracyclo[6.2.1.1$^{3,6}$.0$^{2,7}$]dodecan-4-yl)ethyl group, 1,1-di(9-hydroxytetracyclo[6.2.1.1$^{3,6}$.0$^{2,7}$]dodecan-4-yl)ethyl group, 1,1-di(10-hydroxytetracyclo[6.2.1.1$^{3,6}$.0$^{2,7}$]dodecan-4-yl)ethyl group, 1,1-di(tricyclo[5.2.1.0$^{2,6}$]decan-8-yl)ethyl group, and 1,1-di(4-hydroxytricyclo[5.2.1.0$^{2,6}$]decan-8-yl)ethyl group can be given.

Among these groups representing the structure corresponding to the —C(R$^2$)$_3$ group, t-butyl group, 1-methylcyclopentyl group, 1-ethylcyclopentyl group, 1-methylcyclohexyl group, 1-ethylcyclohexyl group, 2-methyladamantan-2-yl group, 2-ethyladamantan-2-yl group, 2-methylbicyclo[2.2.1]heptan-2-yl group, 2-ethylbicyclo[2.2.1]heptan-2-yl group, 1-methyl-1-(adamantan-1-yl)ethyl group, and 1-methyl-1-(bicyclo[2.2.1]heptan-2-yl)ethyl group are preferable.

The group —COO—C(R$^2$)$_3$ in the formula (I) is an acid-dissociable group which dissociates in the presence of an acid and produces a carboxyl group.

The structural unit (I) may be used in the siloxane resin (A) either individually or in combination of two or more.

The siloxane resin (A) may contain one or more structural units other than the structural unit (I) (such other structural units are hereinafter referred to as "other structural units").

As such other structural units, the structural unit of the following formula (III) (hereinafter referred to as "structural unit (III)"), the structural unit of the following formula (IV) (hereinafter referred to as "structural unit (IV)"), and the like can be given,

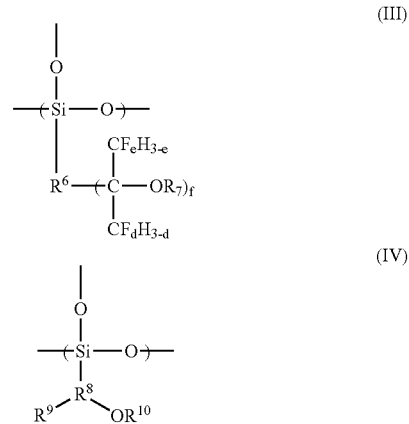

wherein R$^6$ represents a substituted or unsubstituted, linear or branched hydrocarbon group having 1-20 carbon atoms with a valence of (f+1) or a substituted or unsubstituted alicyclic hydrocarbon group having 3-20 carbon atoms with a valence of (f+1), R$^7$ represents a hydrogen atom or a monovalent acid-dissociable group, d and e individually represent an integer of 0-3, provided that d and e satisfy the inequality of (d+e)≧1, f is an integer of 1-3, R$^8$ represents a substituted or unsubstituted trivalent alicyclic hydrocarbon group having 3-20 carbon atoms or a substituted or unsubstituted trivalent heterocyclic group having 3-20 atoms, R$^9$ represents a hydrogen atom, fluorine atom, a linear or branched alkyl group having 1-4 carbon atoms, or a linear or branched fluoroalkyl group having 1-4 carbon atoms, and R$^{10}$ represents a hydrogen atom or a monovalent acid-dissociable group.

As examples of the linear or branched hydrocarbon group having 1-20 carbon atoms with a valence of (f+1) represented by $R^6$ in the formula (III), groups derived from methane, ethane, propane, butane, pentane, hexane, heptane, octane, nonane, decane, dodecane, tetradecane, hexadecane, octadecane, and eicosane can be given.

Of these linear or branched hydrocarbon groups with a valence of (f+1), a group originating from ethane, propane, butane, pentane, hexane, and the like are preferable.

As examples of the alicyclic hydrocarbon group having 3-20 carbon atoms with a valence of (f+1) represented by $R^6$, groups derived from a cycloalkane such as cyclobutane, cyclopentane, cyclohexane, cycloheptane, or cyclooctane; groups derived from a bridged hydrocarbon such as adamantane, bicyclo[2.2.1]heptane, tricyclo[$5.2.1.0^{2,6}$]decane, or tetracyclo[$6.2.1.1^{3,6}.0^{2,7}$]dodecane; and groups obtainable by bonding of a methylene group to the groups derived from a cycloalkane or the groups derived from a bridged hydrocarbon can be given.

Of these alicyclic hydrocarbon groups with a valence of (f+1), a group derived from bicyclo[2.2.1]heptane, a group obtainable by bonding of a methylene group to the group derived from bicyclo[2.2.1]heptane, a group obtainable by bonding of a methylene group to the group derived from tricyclo[$5.2.1.0^{2,6}$]decane, a group obtainable by bonding of a methylene group to the group derived from tetracyclo [$6.2.1.1^{3,6}.0^{2,7}$]dodecane, and the like are preferable.

As examples of the substituents for the linear or branched hydrocarbon groups with a valence of (f+1) or the alicyclic hydrocarbon group with a valence of (f+1) represented by $R^6$, the same groups as those mentioned as examples of the substituent for the divalent linear or branched hydrocarbon group or the divalent alicyclic hydrocarbon group represented by $R^1$ in the formula (I) can be given.

Of these substituents, a fluorine atom, hydroxyl group, cyano group, perfluoroalkyl group having 1-4 carbon atoms, alkoxycarbonylamino group having 2-5 carbon atoms, and the like are preferable. Any number of one or more types of these substituents may be present in the substituted derivatives.

As $R^6$ in the formula (III), a group derived from bicyclo [2.2.1]heptane, a group obtainable by bonding of a methylene group to the group derived from bicyclo[2.2.1]heptane, a group obtainable by bonding of a methylene group to the group derived from tricyclo[$5.2.1.0^{2,6}$]decane, a group obtainable by bonding of a methylene group to the group derived from tetracyclo[$6.2.1.1^{3,6}.0^{2,7}$]dodecane, and the like are preferable.

As examples of the monovalent acid-dissociable group represented by $R^7$, alkoxycarbonyl groups such as a methoxycarbonyl group, ethoxycarbonyl group, n-propoxycarbonyl group, i-propoxycarbonyl group, n-butoxycarbonyl group, 2-methylpropoxycarbonyl group, 1-methylpropoxycarbonyl group, t-butoxycarbonyl group, n-pentyloxycarbonyl group, neopentyloxycarbonyl group, n-hexyloxycarbonyl group, n-heptyloxycarbonyl group, n-octyloxycarbonyl group, 2-ethylhexyloxycarbonyl group, n-nonyloxycarbonyl group, n-decyloxycarbonyl group, cyclopentyloxycarbonyl group, and cyclohexyloxycarbonyl group; alkyl-substituted alicyclic group such as a 1-methylcyclopentyl group, 1-ethylcyclopentyl group, 1-methylcyclohexyl group, 1-ethylcyclohexyl group, 2-methyladamantan-2-yl group, 2-ethyladamantan-2-yl group, 2-methylbicyclo[2.2.1]heptan-2-yl group, and 2-ethylbicyclo[2.2.1]heptan-2-yl group; organic groups bonding to the oxygen atom in the group $R^7$ to form an acetal structure such as a methoxymethyl group, methylthiomethyl group, ethoxymethyl group, ethylthiomethyl group, t-butoxymethyl group, t-butylthiomethyl group, (phenyldimethylsilyl)methoxymethyl group, benzyloxymethyl group, t-butoxymethyl group, siloxymethyl group, 2-methoxyethoxymethyl group, 2,2,2-trichloroethoxymethyl group, bis(2-chloroethoxy)methyl group, 2-(trimethylsilyl)ethoxymethyl group, 1-methoxycyclohexyl group, tetrahydrofuranyl group, tetrahydropyranyl group, 4-methoxytetrahydropyranyl group, tetrahydrothiofuranyl group, tetrahydrothiopyranyl group, 1-methoxyethyl group, 1-ethoxyethyl group, 1-(2-chloroethoxy)ethyl group, 1-methyl-1-methoxyethyl group, 1-methyl-1-benzyloxyethyl group, 1-(2-chloroethoxy)ethyl group, 1-methyl-1-benzyloxy-2-fluoroethyl group, 1-cyclopentyloxyethyl group, 1-cyclohexyloxyethyl group, 1-methoxypropyl group, and 1-ethoxypropyl group; acyl groups such as an acetyl group, propionyl group, butyryl group, heptanoyl group, hexanoyl group, valeryl group, pivaloyl group, isovaleryl group, lauryloyl group, myristoyl group, palmitoyl group, stearoyl group, oxalyl group, malonyl group, scucinyl group, glutaryl group, adipoyl group, piperoyl group, suberoyl group, azelaoyl group, sebacoyl group, acryloyl group, propioloyl group, methacryloyl group, crotonoyl group, oleoyl group, maleoyl group, fumaroyl group, mesaconoyl group, campholoyl group, benzoyl group, phthaloyl group, isophthaloyl group, terephthaloyl group, naphthoyl group, toluoyl group, hydroatropoyl group, atropoyl group, cinnamoyl group, furoyl group, thenoyl group, nicotinoyl group, isonicotinoyl group, p-toluenesulfonyl group, and mesyl group; alkylsilyl groups such as a trimethylsilyl group, ethyldimethylsilyl group, triethylsilyl group, i-propyldimethylsilyl group, i-propyldiethylsilyl group, tri-i-propylsilyl group, t-butyldimethylsilyl group, t-butyldiphenylsilyl group, tribenzylsilyl group, tri-p-xylylsilyl group, methyldiphenylsilyl group, triphenylsilyl group, and t-butylmethoxyphenylsilyl group; alkylgermyl groups such as a trimethylgermyl group, ethyldimethylgermyl group, triethylgermyl group, i-propyldimethylgermyl group, i-propyldiethylgermyl group, tri-i-propylgermyl group, t-butyldimethylgermyl group, t-butyldiphenylgermyl group, tribenzylgermyl group, tri-p-xylylgermyl group, methyldiphenylgermyl group, triphenylgermyl group, and t-butylmethoxyphenylgermyl group; and the like can be given.

Of these monovalent acid-dissociable groups, t-butoxycarbonyl group, methoxymethyl group, ethoxymethyl group, and the like are preferable.

As $R^7$ in the formula (III), a hydrogen atom, t-butoxycarbonyl group, methoxymethyl group, ethoxymethyl group, and the like are preferable.

3 is particularly preferable as d and e, and 1 is particularly preferable as f.

As examples of the trivalent alicyclic hydrocarbon group having 3-20 carbon atoms represented by $R^8$ in the formula (IV), groups derived from a cycloalkane such as cyclobutane, cyclopentane, cyclohexane, cycloheptane, or cyclooctane; groups derived from a bridged hydrocarbon such as adamantane, bicyclo[2.2.1]heptane, tricyclo[$5.2.1.0^{2,6}$] dodecane, or tetracyclo[$6.2.1.1^{3,6}.0^{2,7}$]decane; and the like can be given.

Of these trivalent alicyclic hydrocarbon groups, the groups derived from cyclohexane, bicyclo[2.2.1]heptane, tricyclo[$5.2.1.0^{2,6}$]decane, or the like are preferable.

As examples of the trivalent heterocyclic group having 3-20 carbon atoms represented by $R^8$, groups derived from a non-bridged heterocyclic compound such as tetrahydrofuran, tetrahydropyran, tetrahydrothiofuran, and tetrahydrothiopyran, and groups derived from a bridged heterocyclic compound such as a compound of the following formula (iv-1), and a compound of the following formula (iv-2) can be given.

(iv-1)

(iv-2)

Of these trivalent heterocyclic groups, groups derived from tetrahydropyran or a compound of the above formula (iv-1) are preferable.

As examples of the substituents for the trivalent alicyclic hydrocarbon group or the trivalent heterocyclic group represented by $R^8$, the same groups as those mentioned as examples of the substituent for the divalent linear or branched hydrocarbon group or the divalent alicyclic hydrocarbon group represented by $R^1$ in formula (I) can be given.

Of these substituents, a fluorine atom, hydroxyl group, cyano group, perfluoroalkyl group having 1-4 carbon atoms, alkoxycarbonylamino group having 2-5 carbon atoms, and the like are preferable. Any number of one or more types of these substituents may be present in the substituted derivatives.

As the $R^8$ in the formula (IV), the groups derived from cyclohexane, bicyclo[2.2.1]heptane, tricyclo[5.2.1.0$^{2,6}$]decane, a compound of the formula (iv-1), or the like are preferable.

As examples of the linear or branched alkyl group having 1-4 carbon atoms represented by $R^9$ in the formula (IV), a methyl group, ethyl group, n-propyl group, i-propyl group, n-butyl group, 2-methylpropyl group, 1-methylpropyl group, and t-butyl group can be given.

Of these alkyl groups, a methyl group, ethyl group, and the like are preferable.

As examples of the linear or branched fluoroalkyl group having 1-4 carbon atoms represented by $R^9$, a fluoromethyl group, trifluoromethyl group, 2,2,2-trifluoroethyl group, pentafluoroethyl group, 3,3,3-trifluoro-n-propyl group, 3,3,3,2,2-pentafluoro-n-propyl group, heptafluoro-n-propyl group, 4,4,4-trifluoro-n-butyl group, 4,4,4,3,3-pentafluoro-n-butyl group, 4,4,4,3,3,2,2-heptafluoro-n-butyl group, and nonafluoro-n-butyl group can be given.

Of these fluoroalkyl groups, a trifluoromethyl group, pentafluoroethyl group, heptafluoro-n-propyl group, nonafluoro-n-butyl group, and the like are preferable.

As the $R^9$ in the formula (IV), a hydrogen atom, fluorine atom, methyl group, trifluoromethyl group, pentafluoroethyl group, heptafluoro-n-propyl group, nonafluoro-n-butyl group, and the like are particularly preferable.

As examples of the monovalent acid-dissociable group represented by $R^{10}$ in the structural unit (IV), the same monovalent acid-dissociable groups as those previously given for the $R^7$ group in the formula (III) can be given.

Of these monovalent acid-dissociable groups, t-butoxycarbonyl group, methoxymethyl group, ethoxymethyl group, and the like are preferable.

As $R^{10}$ in the formula (IV), a hydrogen atom, t-butoxycarbonyl group, methoxymethyl group, ethoxymethyl group, and the like are particularly preferable.

As examples of structural units other than the structural unit (III) and the structural unit (IV), in addition to the structural units derived from a trifunctional or tetrafunctional silane compound in respect of a condensation reaction, such as the structural units of the following formula (1) or (2), the structural units derived from a difunctional silane compound in respect of a condensation reaction can be given,

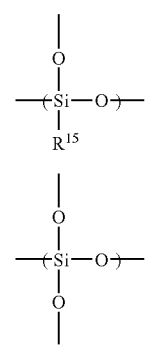

wherein $R^{15}$ represents a linear or branched alkyl group having 1-20 carbon atoms, a linear or branched halogenated alkyl group having 1-20 carbon atoms, a monovalent aromatic hydrocarbon group having 6-20 carbon atoms, or a monovalent halogenated aromatic hydrocarbon group having 6-20 carbon atoms.

In the formula (1), as examples of the linear or the branched alkyl group having 1-20 carbon atoms represented by $R^{15}$, a methyl group, ethyl group, n-propyl group, i-propyl group, n-butyl group, 2-methylpropyl group, 1-methylpropyl group, t-butyl group, n-pentyl group, n-hexyl group, n-heptyl group, n-octyl group, n-nonyl group, and n-decyl group can be given.

As examples of the linear or branched halogenated alkyl group having 1-20 carbon atoms, a trifluoromethyl group, pentafluoroethyl group, heptafluoro-n-propyl group, heptafluoro-i-propyl group, and the like can be given.

As examples of the monovalent aromatic hydrocarbon group having 6-20 carbon atoms, a phenyl group, α-naphthyl group, β-naphthyl group, benzyl group, and phenethyl group can be given.

As examples of the monovalent halogenated aromatic hydrocarbon group having 6-20 carbon groups, a pentafluorophenyl group, perfluorobenzyl group, perfluorophenethyl group, 2-(pentafluorophenyl)hexafluoro-n-propyl group, and 3-(pentafluorophenyl)hexafluoro-n-propyl group can be given. As examples of the alicyclic hydrocarbon group, groups derived from a cycloalkane such as a cyclobutyl group, cyclopentyl group, cyclohexyl group, cycloheptyl group, or cyclooctyl group; and groups such as adamantly group, bicyclo[2.2.1]heptanyl group, tricyclo[5.2.1.0$^{2,6}$]decanyl group, and tetracyclo[6.2.1.1$^{3,6}$.0$^{2,7}$]dodecanyl group can be given.

As preferable groups for $R^{15}$ in the structural group (1), a methyl group, ethyl group, trifluoromethyl group, pentafluoroethyl group, perfluorophenethyl group, 3-(perfluorophenyl)hexafluoro-n-propyl group, cyclohexyl group, bicyclo[2.2.1]heptanyl group, and the like can be given.

The content of the structural unit (I) in the siloxane resin (A) is usually 5-100 mol %, preferably 10-100 mol %, and still more preferably 20-100 mol %. If the content of the structural unit (I) is less than 5 mol %, resolution of the resulting radiation-sensitive resin composition tends to decrease.

The content of the other structural units is usually 95 mol % or less, and preferably 90 mol % or less. If the content of the other structural unit is more than 95 mol %, resolution tends to decrease.

When the siloxane resin (A) has the structural unit (I) and the structural unit (III) and/or the structural unit (IV), the content of the structural unit (I) is usually 5-70 mol %, preferably 5-60 mol %, and still more preferably 10-50 mol %, and the total content of the structural unit (III) and the structural unit (IV) is usually 95 mol % or less, preferably 5-80 mol %, and still more preferably 10-70 mol %. If the amount of the structural unit (I) is less than 5 mol %, resolution tends to decrease. If the amount exceeds 70 mol %, solubility in a low-exposure area tends be insufficient. If the total content of the structural unit (III) and structural unit (IV) is more than 95 mol %, resolution tends to decrease.

The polystyrene-reduced weight average molecular weight (hereinafter referred to as "Mw") of the siloxane resin (A) determined by gel permeation chromatography (GPC) is usually 500-1,000,000, preferably 500-100,000, and still more preferably 500-40,000. If the Mw of the siloxane resin (A) is less than 500, the glass transition temperature (Tg) of the resulting resin tends to decrease. If the Mw exceeds 1,000,000, solubility of the resin in solvents tends to decrease.

Manufacturing Method of Siloxane Resin (A)

The siloxane resin (A) can be produced by polycondensation of a silane compound providing the structural unit (I), optionally together with a silane compound providing a different structural unit under acidic or basic conditions in the presence or absence of a solvent, preferably initially under acidic conditions, followed by continued reaction under basic conditions.

The polycondensation method for producing the siloxane resin (A) will now be described.

An acidic catalyst is used in the polycondensation under acidic conditions.

As examples of the acidic catalyst, hydrochloric acid, sulfuric acid, nitric acid, formic acid, acetic acid, n-propionic acid, butyric acid, valeric acid, oxalic acid, malonic acid, succinic acid, maleic acid, fumaric acid, adipic acid, phthalic acid, terephthalic acid, acetic anhydride, maleic anhydride, citric acid, boric acid, phosphoric acid, titanium tetrachloride, zinc chloride, aluminium chloride, benzenesulfonic acid, p-toluenesulfonic acid, and methanesulfonic acid can be given.

Of these acidic catalysts, hydrochloric acid, sulfuric acid, acetic acid, oxalic acid, malonic acid, maleic acid, fumaric acid, acetic anhydride, maleic anhydride, and the like are preferable.

These acidic catalysts may be used either individually or in combination of two or more.

The acidic catalysts are usually used in the amount of 0.01-10,000 parts by weight, for 100 parts by weight of the silane compound.

A basic catalyst is used in the polycondensation and reaction under basic conditions. As examples of inorganic bases among the above basic catalysts, lithium hydroxide, sodium hydroxide, potassium hydroxide, calcium hydroxide, barium hydroxide, sodium hydrogencarbonate, potassium hydrogencarbonate, sodium carbonate, and potassium carbonate can be given.

In addition, the following organic bases can also be used as the basic catalyst: linear, branched, or cyclic monoalkylamines such as n-hexylamine, n-heptylamine, n-octylamine, n-nonylamine, n-decylamine, and cyclohexylamine; linear, branched, or cyclic dialkylamines such as di-n-butylamine, di-n-pentylamine, di-n-hexylamine, di-n-heptylamine, di-n-octylamine, di-n-nonylamine, di-n-decylamine, cyclohexylmethylamine, and dicyclohexylamine; linear, branched, or cyclic trialkylamines such as triethylamine, tri-n-propylamine, tri-n-butylamine, tri-n-pentylamine, tri-n-hexylamine, tri-n-heptylamine, tri-n-octylamine, tri-n-nonylamine, tri-n-decylamine, cyclohexyldimethylamine, dicyclohexylmethylamine, and tricyclohexylamine; aromatic amines such as aniline, N-methylaniline, N,N-dimethylaniline, 2-methylaniline, 3-methylaniline, 4-methylaniline, 4-nitroaniline, diphenylamine, triphenylamine, and naphthylamine; diamines such as ethylenediamine, N,N,N', N'-tetramethylethylenediamine, tetramethylenediamine, hexamethylenediamine, 4,4'-diaminodiphenylmethane, 4,4'-diaminodiphenyl ether, 4,4'-diaminobenzophenone, 4,4'-diaminodiphenylamine, 2,2-bis(4-aminophenyl)propane, 2-(3-aminophenyl)-2-(4-aminophenyl)propane, 2-(4-aminophenyl)-2-(3-hydroxyphenyl)propane, 2-(4-aminophenyl)-2-(4-hydroxyphenyl)propane, 1,4-bis[1-(4-aminophenyl)-1-methylethyl]benzene, and 1,3-bis[1-(4-aminophenyl)-1-methylethyl]benzene; imidazoles such as imidazole, benzimidazole, 4-methylimidazole, and 4-methyl-2-phenylimidazole; pyridines such as pyridine, 2-methylpyridine, 4-methylpyridine, 2-ethylpyridine, 4-ethylpyridine, 2-phenylpyridine, 4-phenylpyridine, 2-methyl-4-phenylpyridine, nicotine, nicotinic acid, nicotinamide, quinoline, 4-hydroxyquinoline, 8-oxyquinoline, and acridine; piperazines such as piperazine and 1-(2'-hydroxyethyl) piperazine; as well as other nitrogen-containing heterocyclic compounds such as pyrazine, pyrazole, pyridazine, quinoxaline, purine, pyrrolidine, piperidine, morpholine, 4-methylmorpholine, 1,4-dimethylpiperazine, and 1,4-diazabicyclo [2.2.2]octane.

Of these basic catalysts, triethylamine, tri-n-propylamine, tri-n-butylamine, pyridine, and the like are preferable.

These basic catalysts may be used either individually or in combination of two or more.

The basic catalysts are usually used in the amount of 0.01-10,000 parts by weight, for 100 parts by weight of the silane compound.

As examples of the solvent used in the polycondensation, linear or branched ketones such as 2-butanone, 2-pentanone, 3-methyl-2-butanone, 2-hexanone, 4-methyl-2-pentanone, 3-methyl-2-pentanone, 3,3-dimethyl-2-butanone, 2-heptanone, and 2-octanone; cyclic ketones such as cyclopentanone, 3-methylcyclopentanone, cyclohexanone, 2-methylcyclohexanone, 2,6-dimethylcyclohexanone, and isophorone; propylene glycol monoalkyl ether acetates such as propylene glycol monomethyl ether acetate, propylene glycol monoethyl ether acetate, propylene glycol mono-n-propyl ether acetate, propylene glycol mono-i-propyl ether acetate, propylene glycol mono-n-butyl ether acetate, propylene glycol mono-1-butyl ether acetate, propylene glycol mono-sec-butyl ether acetate, and propylene glycol mono-t-butyl ether acetate; alkyl 2-hydroxypropionates such as methyl 2-hydroxypropionate, ethyl 2-hydroxypropionate, n-propyl 2-hydroxypropionate, i-propyl 2-hydroxypropionate, n-butyl 2-hydroxypropionate, i-butyl 2-hydroxypropionate, sec-butyl 2-hydroxypropionate, and t-butyl 2-hydroxypropionate; alkyl 3-alkoxypropionates such as methyl 3-methoxypropionate, ethyl 3-methoxypropionate, methyl 3-ethoxypropionate, and ethyl 3-ethoxypropionate; alcohols such as ethanol, n-propanol, i-propanol, n-butanol, t-butanol, cyclohexanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether, and propylene glycol mono-n-propyl ether; dialkylene glycol dialkyl ethers such as diethylene glycol dimethyl ether, diethylene glycol diethyl ether, diethylene glycol di-n-propyl ether, diethylene glycol di-n-butyl ether; ethylene glycol monoalkyl ether acetates such as ethylene glycol monomethyl ether acetate, ethylene glycol monoethyl ether acetate, and ethylene glycol mono-n-propyl ether acetate; aromatic hydrocarbons such as toluene and xylene; other esters such as ethyl 2-hydroxy-2-methylpropionate, ethyl ethoxyacetate, ethyl hydroxyacetate, methyl 2-hydroxy-3-methylbutyrate, butyl 3-methoxyacetate, butyl 3-methyl-3-methoxyacetate, butyl 3-methyl-3-methoxypropionate, butyl 3-methyl-3-methoxybutyrate, ethyl acetate, n-propyl acetate, n-butyl acetate, methyl acetoacetate, ethyl acetoacetate, methylpyruvate, and ethyl pyruvate; N-methylpyrrolidone, N,N-dimethylformamide, N,N-dimethylacetamide, benzyl ethyl ether, di-n-hexyl ether, diethylene glycol monomethyl ether, diethylene glycol monoethyl ether, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, and the like can be given.

These solvents may be used either individually or in combination of two or more.

These solvents are usually used in the amount of 2,000 parts by weight or less for 100 parts by weight of all of the silane compounds.

The polycondensation reaction for producing the siloxane resin (A) can be preferably carried out either in the presence or absence of a solvent, such as 2-butanone, 2-pentanone, 3-methyl-2-butanone, 2-hexanone, 4-methyl-2-pentanone, 3-methyl-2-pentanone, 3,3-dimethyl-2-butanone, 2-heptanone, 2-octanone, cyclopentanone, 3-methylcyclopentanone, cyclohexanone, 2-methylcyclohexanone, 2,6-dimethylcyclohexanone, diethylene glycol dimethyl ether, diethylene glycol diethyl ether, diethylene glycol di-n-propyl ether, diethylene glycol di-n-butyl ether, ethylene glycol monomethyl ether acetate, ethylene glycol monoethyl ether acetate, and ethylene glycol mono-n-propyl ether acetate.

In addition, water may be added to the reaction mixture of the polycondensation reaction. The amount of water to be added is usually 10,000 parts by weight or less for 100 parts by weight of all of the silane compounds.

The polycondensation reaction under acidic conditions or basic conditions and the reaction under basic conditions are carried out at a temperature of usually −50 to 300° C., and preferably 20 to 100° C., usually for a period of one minute to 100 hours.

Fluorine-containing Resin (B)

The component (B) (hereinafter referred to as "fluorine-containing resin (B)") of the present invention is a resin having the structural unit of the above-described formula (II) (hereinafter referred to as "structural unit (II)"). Preferable groups for $R^3$ in the formula (II) are a hydrogen atom, a fluorine atom, and trifluoromethyl group, with the hydrogen atom being particularly preferable.

As examples of the linear or branched hydrocarbon group having 1-20 carbon atoms with a valence of (c+1) represented by $R^4$ in the formula (II) and the linear or branched hydrocarbon group having 1-20 carbon atoms with a valence of (c+1) in the group to which the —COO— group or —O— group bonds, groups derived from methane, ethane, propane, butane, pentane, hexane, heptane, octane, nonane, decane, dodecane, tetradecane, hexadecane, octadecane, and eicosane can be given.

Of these linear or branched hydrocarbon groups with a valence of (c+1), a group originating from methane, ethane, propane, butane, or the like is preferable.

As examples of the alicyclic hydrocarbon group having 3-20 carbon atoms with a valence of (c+1) represented by $R^4$ and the alicyclic hydrocarbon group having 3-20 carbon atoms with a valence of (c+1) in the group to which the —COO— group or —O— group bonds, groups derived from a cycloalkane such as cyclobutane, cyclopentane, cyclohexane, cycloheptane, or cyclooctane; groups derived from a bridged hydrocarbon such as adamantane, bicyclo[2.2.1]heptane, tricyclo[5.2.1.0²]decane, or tetracyclo[6.2.1.1$^{3,6}$.0$^{2,7}$]dodecane; and groups obtainable by bonding of a methylene group to the groups derived from these cycloalkanes or bridged hydrocarbons can be given.

Of these alicyclic hydrocarbon groups with a valence of (c+1), the groups derived from cyclohexane, bicyclo[2.2.1]heptane, tricyclo[5.2.1.0$^{2,6}$]dodecane, or the like are preferable.

As examples of the aromatic hydrocarbon group having 6-20 carbon atoms with a valence of (c+1) represented by $R^4$ and the aromatic hydrocarbon group having 6-20 carbon atoms with a valence of (c+1) in the group to which the —COO— group or —O— group bonds, groups derived from benzene, toluene, o-xylene, m-xylene, p-xylene, naphthalene, anthracene, phenanthrene, or the like, and obtainable by bonding of a methylene group to these groups can be given.

Of these aromatic hydrocarbon groups with a valence of (c+1), groups derived from benzene, naphthalene, and the like are preferable.

As examples of the substituents for the linear or branched hydrocarbon groups with a valence of (c+1), the alicyclic hydrocarbon group with a valence of (c+1), or the aromatic hydrocarbon group with a valence of (c+1) represented by $R^4$, the same groups as those mentioned as examples of the substituent for the divalent linear or branched hydrocarbon group or the divalent alicyclic hydrocarbon group represented by $R^1$ in formula (I) can be given.

Of these substituents, a fluorine atom, hydroxyl group, cyano group, perfluoroalkyl group having 1-4 carbon atoms, alkoxycarbonylamino group having 2-5 carbon atoms, and the like are preferable.

Any number of one or more types of these substituents may be present in the substituted derivatives.

As examples of $R^4$ in the formula (II), the groups derived from benzene, methane, cyclohexane, bicyclo[2.2.1]heptane, tricyclo[5.2.1.0$^{2,6}$]dodecane, or the like are preferable.

As examples of the monovalent acid-dissociable group represented by $R^5$, alkoxycarbonyl groups such as a methoxycarbonyl group, ethoxycarbonyl group, n-propoxycarbonyl group, i-propoxycarbonyl group, n-butoxycarbonyl group, 2-methylpropoxycarbonyl group, 1-methylpropoxycarbonyl group, t-butoxycarbonyl group, n-pentyloxycarbonyl group, neopentyloxycarbonyl group, n-hexyloxycarbonyl group, n-heptyloxycarbonyl group, n-octyloxycarbonyl group, 2-ethylhexyloxycarbonyl group, n-nonyloxycarbonyl group, n-decyloxycarbonyl group, cyclopentyloxycarbonyl group, and cyclohexyloxycarbonyl group; alkyl-substituted alicyclic group such as a 1-methylcyclopentyl group, 1-ethylcyclopentyl group, 1-methylcyclohexyl group, 1-ethylcyclohexyl group, 2-methyladamantan-2-yl group, 2-ethyladamantan-2-yl group, 2-methylbicyclo[2.2.1]heptan-2-yl group, and 2-ethylbicyclo[2.2.1]heptan-2-yl group; organic groups bonding to the oxygen atom in the group $R^5$ to form an acetal structure such as a methoxymethyl group, methylthiomethyl group, ethoxymethyl group, ethylthiomethyl group, t-butoxymethyl group, t-butylthiomethyl group, (phenyldimethylsilyl)methoxymethyl group, benzyloxymethyl group, t-butoxymethyl group, siloxymethyl group, 2-methoxyethoxymethyl group, 2,2,2-trichloroethoxymethyl group, bis(2-chloroethoxy)methyl group, 2-(trimethylsilyl)ethoxymethyl group, 1-methoxycyclohexyl group, tetrahydrofuranyl group, tetrahydropyranyl group, 4-methoxytetrahydropyranyl group, tetrahydrothiofuranyl group, tetrahydrothiopyranyl group, 1-methoxyethyl group, 1-ethoxyethyl group, 1-(2-chloroethoxy)ethyl group, 1-methyl-1-methoxyethyl group, 1-methyl-1-benzyloxyethyl group, 1-(2-chloroethoxy)ethyl group, 1-methyl-1-benzyloxy-2-fluoroethyl group, 1-cyclopentyloxyethyl group, 1-cyclohexyloxyethyl group, 1-methoxypropyl group, and 1-ethoxypropyl group; acyl groups such as an acetyl group, propionyl group, butyryl group, heptanoyl group, hexanoyl group, valeryl group, pivaloyl group, isovaleryl group, lauryloyl group, myristoyl group, palmitoyl group, stearoyl group, oxalyl group, malonyl group, scucinyl group, glutaryl group, adipoyl group, piperoyl group, suberoyl group, azelaoyl group, sebacoyl group, acryloyl group, propioloyl group, methacryloyl group, crotonoyl group, oleoyl group, maleoyl group, fumaroyl group, mesaconoyl group, campholoyl group, benzoyl group, phthaloyl group, isophthaloyl group, terephthaloyl group, naphthoyl group, toluoyl group, hydroatropoyl group, atropoyl group, cinnamoyl group, furoyl group, thenoyl group, nicotinoyl group, isonicotinoyl group, p-toluenesulfonyl group, and mesyl group; alkylsilyl groups such as a trimethylsilyl group, ethyldimethylsilyl group, triethylsilyl group, i-propyldimethylsilyl group, i-propyldiethylsilyl group, tri-i-propylsilyl group, t-butyldimethylsilyl group, t-butyldiphenylsilyl group, tribenzylsilyl group, tri-p-xylylsilyl group, methyldiphenylsilyl group, triphenylsilyl group, and t-butylmethoxyphenylsilyl group; alkylgermyl groups such as a trimethylgermyl group, ethyldimethylgermyl group, triethylgermyl group, i-propyldimethylgermyl group, i-propyldiethylgermyl group, tri-i-propylgermyl group, t-butyldimethylgermyl group, t-butyldiphenylgermyl group, tribenzylgermyl group, tri-p-xylylgermyl group, methyldiphenylgermyl group, triphenylgermyl group, and t-butylmethoxyphenylgermyl group; and the like can be given.

Of these monovalent acid-dissociable groups, t-butoxycarbonyl group, methoxymethyl group, ethoxymethyl group, and the like are preferable.

As $R^5$ in the formula (II), a hydrogen atom, t-butoxycarbonyl group, methoxymethyl group, ethoxymethyl group, and the like are particularly preferable.

3 is particularly preferable as a and b, and 1 is particularly preferable as c.

The recurring units (II) may be used in the fluorine-containing resin (B) either individually or in combination of two or more.

In addition, the fluorine-containing resin (B) may comprise one or more recurring units other than the recurring unit (II) (hereinafter referred to as "other recurring units").

As preferable examples of other recurring units, a recurring unit of the following formula (V) and the recurring unit of the following formula (VI) can be given:

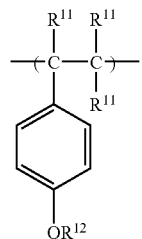

(V)

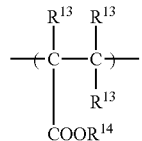

(VI)

wherein $R^{11}$ individually represents a hydrogen atom, fluorine atom, or trifluoromethyl group, $R^{12}$ represents a hydrogen atom or a monovalent acid-dissociable group, $R^{13}$ individually represents a hydrogen atom, fluorine atom, or trifluoromethyl group, and $R^{14}$ represents a hydrogen atom or a monovalent acid-dissociable group.

Preferable groups for $R^{11}$ in the formula (V) are a hydrogen atom, a fluorine atom, and trifluoromethyl group, with the hydrogen atom being particularly preferable.

As examples of the monovalent acid-dissociable group represented by $R^{12}$ in the structural unit (V), the same monovalent acid-dissociable groups as those previously given for the $R^5$ group in the formula (II) can be given.

Of these monovalent acid-dissociable groups, t-butoxycarbonyl group, methoxymethyl group, ethoxymethyl group, and the like are preferable.

As $R^{12}$ in the formula (V), a hydrogen atom, t-butyl group, t-butoxycarbonyl group, methoxymethyl group, ethoxymethyl group, tetrahydropyranyl group, 1-ethoxyethyl group, and the like are particularly preferable.

Preferable groups for $R^{13}$ in the formula (VI) are a hydrogen atom, fluorine atom, methyl group, and trifluoromethyl group, with the hydrogen atom being particularly preferable.

As examples of the monovalent acid-dissociable group represented by $R^{14}$ in the formula (VI), in addition to the same structural units corresponding to $-C(R^2)_3$ in the formula (I) and the same monovalent acid-dissociable groups as those previously given for the $R^5$ group in the formula (II), substituted methyl groups such as a phenacyl group, 4-bromophenacyl group, 4-methoxyphenacyl group, 4-methylthiophenacyl group, a-methylphenacyl group, cyclopropylmethyl group, benzyl group, diphenylmethyl group, triphenylmethyl group, 4-bromobenzyl group, 4-nitrobenzyl group, 4-methoxybenzyl group, 4-methylthiobenzyl group, 4-ethoxybenzyl group, 4-ethylthiobenzyl group, piperonyl group, methoxycarbonylmethyl group, ethoxycarbonylmethyl group, n-propoxycarbonylmethyl group, i-propoxycarbonylmethyl group, n-butoxycarbonylmethyl group, and t-butoxycarbonylmethyl; 1-substituted ethyl groups such as a 1-phenylethyl group, 1,1-diphenylethyl group, 1-methoxycarbonylethyl group, 1-ethoxycarbonylethyl group, 1-n-propoxycarbonylethyl group, 1-i-propoxycarbonylethyl group, 1-n-butoxycarbonylethyl group, and 1-t-butoxycarbonylethyl group; 1-branched alkyl groups such as i-propyl group, 1-methylpropyl group, and 1-methylbutyl group; cyclic acid-dissociable groups such as a cyclopropyl group, cyclopentyl group, cyclohexyl group, cyclohexenyl group, 3-hydroxycyclopentyl group, 4-hydroxycyclohexyl group, bicyclo[2.2.1]heptan-2-yl group, 5-hydroxybicyclo[2.2.1]heptan-2-yl group, 5-[2-hydroxy-2,2-di(trifluoromethyl)ethyl]bicyclo[2.2.1]heptan-2-yl group, tetracyclo[6.2.1.1$^{3,6}$.0$^{2,7}$]dodecan-4-yl group, 9-hydroxytetracyclo[6.2.1.1$^{3,6}$.0$^{2,7}$]dodecan-4-yl group, and 9-[2-hydroxy-2,2-di(trifluoromethyl)ethyl]tetracyclo[6.2.1.1$^{3,6}$.0$^{2,7}$]dodecan-4-yl group; and the like can be given.

Of these monovalent acid-dissociable groups, a t-butyl group, t-butoxycarbonyl group, 1-methylcyclopentyl group, 1-ethylcyclopentyl group, 1-methylcyclohexyl group, 1-ethylcyclohexyl group, 1-methoxyethyl group, 1-ethoxyethyl group, tetrahydrofuranyl group, tetrahydropyranyl group, benzyl group, t-butoxycarbonylmethyl group, 5-[2-hydroxy-2,2-di(trifluoromethyl)ethyl]bicyclo[2.2.1]heptan-2-yl group, 9-[2-hydroxy-2,2-di(trifluoromethyl)ethyl]tetracyclo[6.2.1.1$^{3,6}$.0$^{2,7}$]dodecan-4-yl group, and the like are preferable.

As examples of the recurring units other than the recurring units (V) and (VI), units obtainable by cleavage of a polymerizable unsaturated bond in the compound such as vinyl aromatic compounds such as styrene, α-methylstyrene, 4-methylstyrene, 4-methoxystyrene, and 4-(2-t-butoxycarbonylethyloxy)styrene; (meth)acrylates such as methyl(meth)acrylate, ethyl(meth)acrylate, n-propyl(meth)acrylate, n-butyl (meth)acrylate, 2-methylpropyl(meth)acrylate, n-pentyl(meth)acrylate, n-hexyl (meth)acrylate, 2-ethylhexyl(meth)acrylate, phenyl(meth)acrylate, and phenethyl (meth)acrylate; hydroxyalkyl esters of unsaturated carboxylic acid such as 2-hydroxyethyl(meth)acrylate, 2-hydroxypropyl(meth)acrylate, and 3-hydroxypropyl (meth)acrylate; carboxylalkyl esters of unsaturated carboxylic acid such as 2-carboxyethyl(meth)acrylate, 2-carboxy-n-propyl (meth)acrylate, and 3-carboxy-n-propyl(meth)acrylate; unsaturated carboxylic acids (anhydrides) such as (meth)acrylic acid, crotonic acid, maleic acid, maleic anhydride, fumaric acid, and cinnamic acid; unsaturated nitryl compounds such as (meth)acrylonitrile, α-chloroacrylonitrile, crotonitrile, maleinitrile, and fumaronitrile; unsaturated amide compounds such as (meth)acrylamide, N,N-dimethyl (meth)acrylamide, crotonamide, maleinamide, and fumaramide; unsaturated imide compounds such as maleimide, N-phenylmaleimide, and N-cyclohexylmaleimide; and other nitrogen-containing vinyl compounds such as N-vinyl-ε-caprolactam, N-vinylpyrrolidone, 2-vinylpyridine, 3-vinylpyridine, 4-vinylpyridine, 2-vinylimidazole, and 4-vinylimidazole; and the like can be given.

The amount of the recurring unit (II) in the fluorine-containing resin (B) is 5-100 mol %, preferably 10-100 mol %, and still more preferably 15-100 mol % of the total amount of the recurring units. If the content of the recurring unit (II) is less than 5 mol %, the effect of LER improvement tends to decrease.

The content of the other structural units is usually 95 mol % or less, and preferably 90 mol % or less. If the content of the other recurring units is more than 95 mol %, the effect of LER improvement and resolution tend to decrease.

When the fluorine-containing resin (B) has the recurring unit (II) and the recurring unit (V) and/or the recurring unit (VI), the content of the recurring unit (II) is usually 5-95 mol %, preferably 5-90 mol %, and still more preferably 5-85 mol %, and the total content of the recurring unit (V) and the recurring unit (VI) is usually 5-95 mol %, preferably 10-95 mol %, and still more preferably 15-95 mol %. If the amount of the recurring unit (II) is less than 5 mol %, the effect of LER improvement tends to decrease. If more than 95 mol %, solubility in the low exposure area tends to decrease. If the total content of the recurring unit (V) and the recurring unit (VI) is less than 5 mol %, resolution of the resist tends to decrease. If the content exceeds 95 mol %, the effect of LER improvement tends to decrease.

Mw of the fluorine-containing resin (B) is usually 500-100,000, preferably 1,000-50,000, and particularly preferably 1,000-20,000. If the Mw of the fluorine-containing resin (B) is less than 500, the residual film proportion tends to decrease. If the Mw exceeds 100,000, solubility in the low exposure area tends to decrease.

The fluorine-containing resin (B) can be manufactured by polymerizing a vinyl monomer providing the recurring unit (II), optionally together with vinyl monomers providing the other recurring units, using a radical polymerization initiator, for example, by a conventional method.

Radiation-sensitive Resin Composition

The radiation-sensitive resin composition of the present invention comprises a siloxane resin (A), a fluorine-containing resin (B), and a radiation-sensitive acid generator (hereinafter referred to as "acid generator (C)").

Either one resin or two or more resins can be selected from each of the siloxane resin (A) and fluorine-containing resin (B) and used in the radiation-sensitive resin composition of the present invention.

The ratio of the siloxane resin (A) and the fluorine-containing resin (B) in the radiation-sensitive resin composition of the present invention is preferably 99.5:0.5-50:50 (by weight), and more preferably 99.5:0.5-70:30 (by weight).

One or more siloxane resins other than the siloxane resin (A) can be used in combination with the siloxane resin (A) in the radiation-sensitive resin composition of the present invention. Similarly, one or more non-silicon resins can be used in combination with the fluorine-containing resin (B) in the radiation-sensitive resin composition of the present invention.

As examples of such other siloxane resins, resins having one or more structural units shown by the above formula (1) or (2) can be given, and as examples of the other non-silicon resins, the resins having one or more above-described recurring units can be given.

Acid Generator (C)

The acid generator (C) is a component to generate an acid upon exposure and causes the acid-dissociable group in the siloxane resin (A) or the fluorine-containing resin (B) to dissociate by the action of the acid. As a result, exposed areas of the resist film become readily soluble in an alkaline developer, whereby a positive-tone resist pattern is formed.

Although any acid generator (C) that can exhibit the above action can be used in the present invention without any specific limitation, an acid generator containing a compound that generates trifluoromethane sulfonic acid or an acid of the following formula (3) (hereinafter referred to as "acid (3)") upon exposure is preferable. Such a compound is hereinafter referred to as an acid generator (C1),

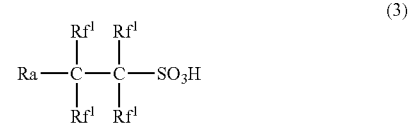

(3)

wherein $Rf^2$ individually represents a fluorine atom or a trifluoromethyl group, and Ra represents a hydrogen atom, a fluorine atom, a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

As examples of the acid generator (C1), onium salts, sulfone compounds, sulfonic acid compounds, carboxylic acid compounds, diazoketone compounds, and halogen-containing compounds can be given.

Although an acid generator (C1) alone can be used as the acid generator (C) in the present invention, the acid generator (C1) can be used in combination with a radiation sensitive acid generator (hereinafter referred to as "acid generator (C2)") generating an acid of the following formula (4) ("acid (4)"), an acid of the following formula (5) ("acid (5)"), or an acid of the following formula (6) ("acid (6)").

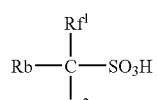
(4)

(5)

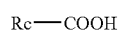
(6)

In the formula (4), $Rf^1$ represents a fluorine atom or a trifluoromethyl group, $Rf^2$ represents a hydrogen atom, fluorine atom, methyl group, or trifluoromethyl group, and Rb represents a hydrogen atom, a linear or branched alkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

In the formula (5), Rs represents a linear or branched alkyl group having 1-20 carbon atoms or a substituted or unsubstituted monovalent cyclic hydrocarbon group having 3-20 carbon atoms.

In the formula (6), Rc represents a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

As specific examples of the linear or branched alkyl group having 1-20 carbon atoms represented by Ra, Rb, Rs, or Rc in the formulas (3) to (6), a methyl group, ethyl group, n-propyl group, i-propyl group, n-butyl group, i-butyl group, sec-butyl group, t-butyl group, n-pentyl group, n-hexyl group, n-heptyl group, and n-octyl group can be given.

As specific examples of the linear or branched fluoroalkyl group having 1-20 carbon atoms represented by Ra or Rc, a trifluoromethyl group, pentafluoroethyl group, heptafluoro-n-propyl group, heptafluoro-1-propyl group, nonafluoro-n-butyl group, nonafluoro-1-butyl group, nonafluoro-sec-butyl group, nonafluoro-t-butyl group, perfluoro-n-pentyl group, perfluoro-n-hexyl group, perfluoro-n-heptyl group, and perfluoro-n-octyl group can be given.

As examples of the monovalent cyclic hydrocarbon group having 3-20 carbon atoms, the monovalent cyclic fluoro-hydrocarbon group having 3-20 carbon atoms, or their substituted derivatives represented by Ra, Rb, Rs, or Rc, and groups of the following formulas (7)-(13) can be given.

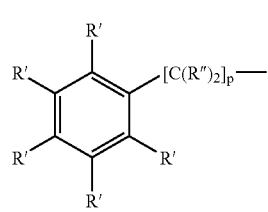
(7)

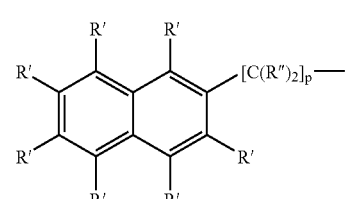
(8)

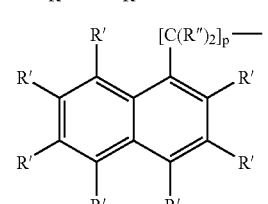
(9)

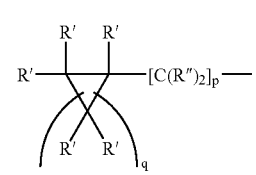
(10)

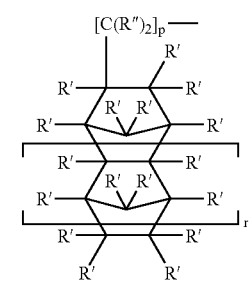
(11)

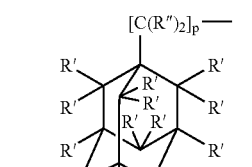
(12)

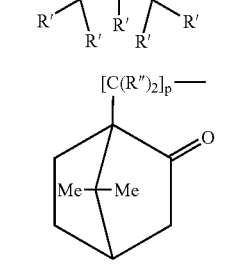
(13)

(Me represents a methyl group. Hereinafter the same.)

In the formulas (7)-(13), R' individually represents a hydrogen atom, halogen atom, hydroxyl group, acetyl group, carboxyl group, nitro group, cyano group, primary amino group, secondary amino group, linear or branched alkoxyl group having 1-10 carbon atoms, linear or branched alkyl group having 1-10 carbon atoms, or linear or branched fluoroalkyl group having 1-10 carbon atoms, R" individually represents a hydrogen atom, halogen atom, linear or branched alkyl group having 1-10 carbon atoms, or a linear or branched fluoroalkyl group having 1-10 carbon atoms, and p is an integer of 0-10. In the formula (10), q is an integer of 1-18. In the formula (11), r is an integer of 0-3.

As preferable examples of the acids (3) in the present invention, trifluoromethanesulfonic acid, pentafluoroethanesulfonic acid, heptafluoro-n-propanesulfonic acid, nonafluoro-n-butanesulfonic acid, perfluoro-n-octanesulfonic acid, 1,1,2,2,-tetrafluoro-n-propanesulfonic acid, 1,1,2,2,-tetrafluoro-n-butanesulfonic acid, and 1,1,2,2-tetrafluoro-n-octanesulfonic acid, as well as acids obtainable by bonding a group —CF$_2$CF$_2$SO$_3$H, —CF$_2$CF(CF$_3$)SO$_3$H, —CF(CF$_3$)CF$_2$SO$_3$H, —CF(CF$_3$)CF(CF$_3$)SO$_3$H, —C(CF$_3$)$_2$CF$_2$SO$_3$H, or —CF$_2$C(CF$_3$)$_2$SO$_3$H to the bonding site of the group of any of the above formulas (7)-(13), for example, the acids of the following formulas (3-1) to (3-10) can be given.

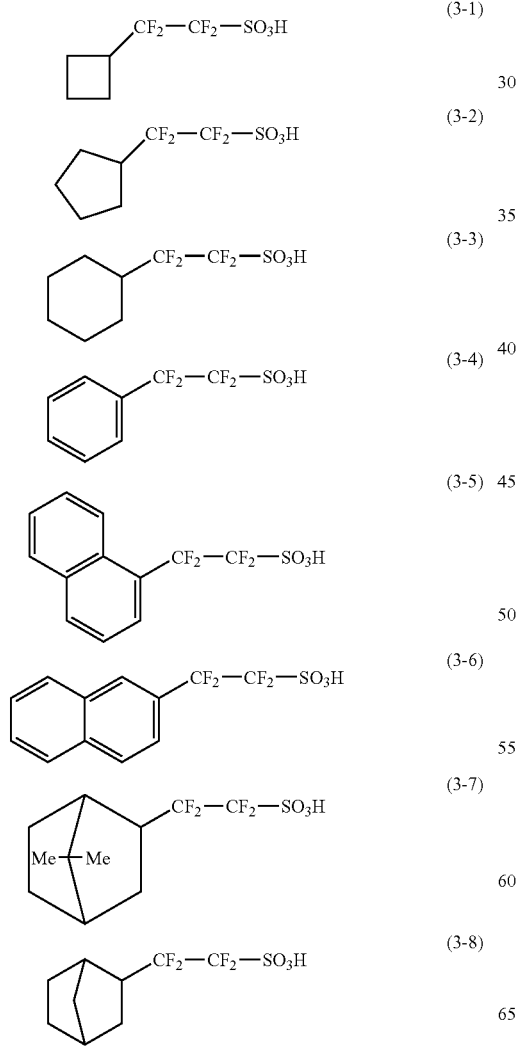

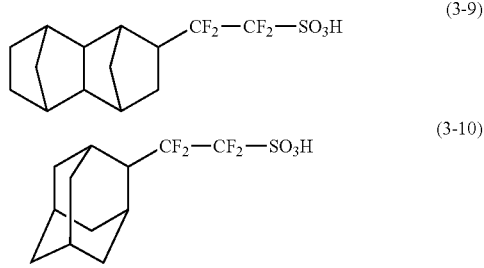

As preferable examples of the acids (4) in the present invention, 1-fluoroethanesulfonic acid, 1-fluoro-n-propanesulfonic acid, 1-fluoro-n-butanesulfonic acid, 1-fluoro-n-octanesulfonic acid, 1,1-difluoroethanesulfonic acid, 1,1-difluoro-n-propanesulfonic acid, 1,1-difluoro-n-butanesulfonic acid, 1,1-difluoro-n-octanesulfonic acid, 1-trifluoromethyl-n-propanesulfonic acid, 1-trifluoromethyl-n-butanesulfonic acid, 1-trifluoromethyl-n-octanesulfonic acid, 1,1-bis(trifluoromethyl)ethanesulfonic acid, 1,1-bis(trifluoromethyl)-n-propanesulfonic acid, 1,1-bis(trifluoromethyl)-n-butanesulfonic acid, and 1,1-bis(trifluoromethyl)-n-octanesulfonic acid, as well as acids produced by bonding a group —CF$_2$SO$_3$H, —CHFSO$_3$H, —CH(CF$_3$)SO$_3$H, or —C(CF$_3$)$_2$SO$_3$H to the bonding site of the group of any of the above formulas (7)-(13), for example, the acids of the following formulas (4-1) to (4-40) can be given.

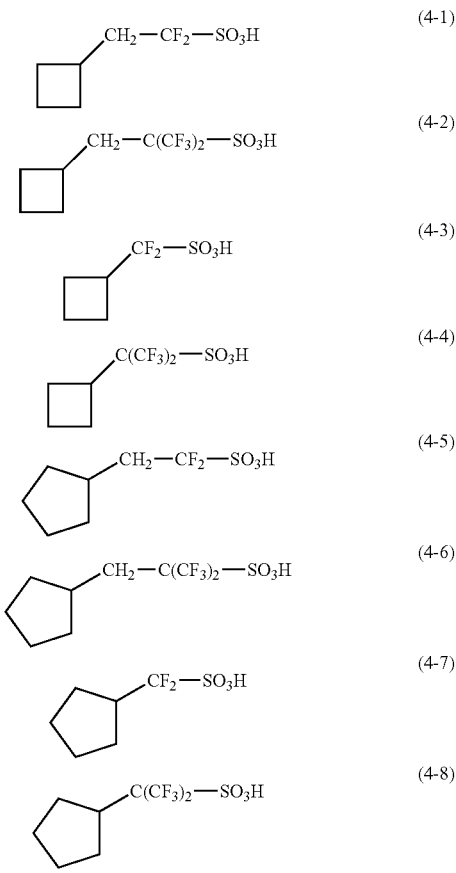

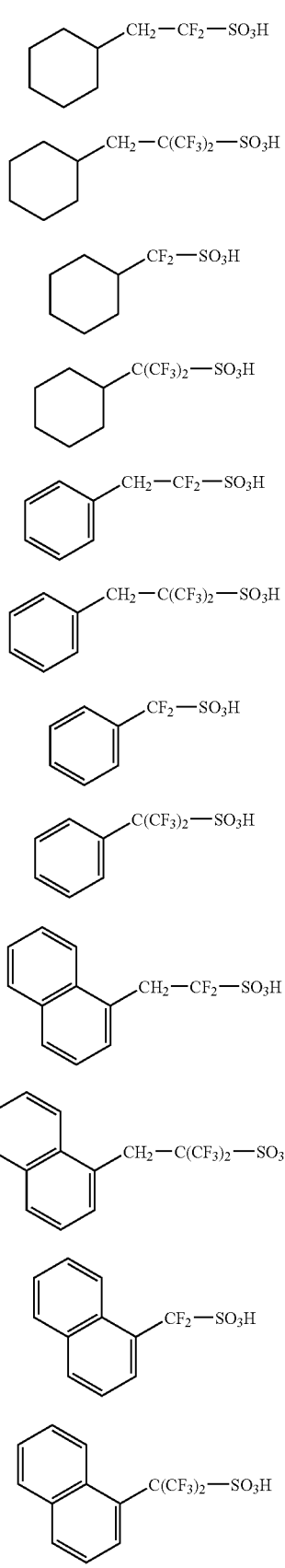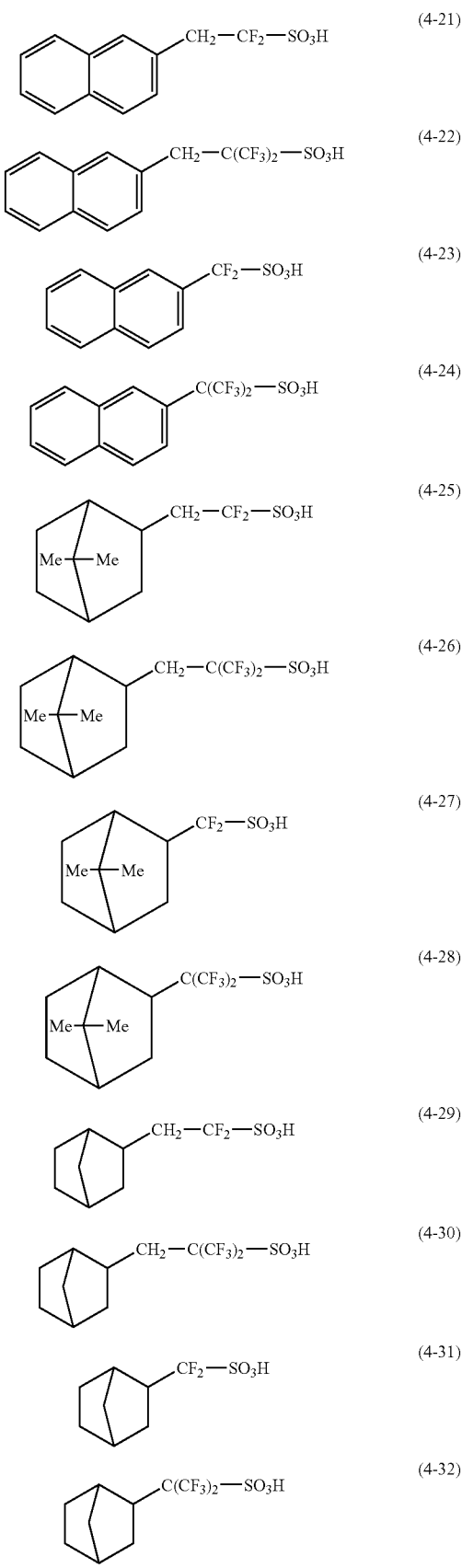

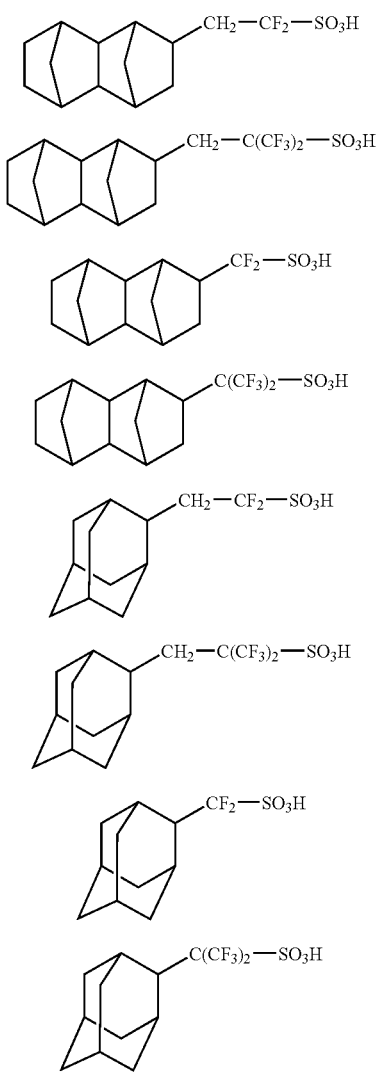

As preferable examples of the acid (5) in the present invention, linear or branched cycloalkyl sulfonic acids such as methanesulfonic acid, ethanesulfonic acid, n-propanesulfonic acid, n-butanesulfonic acid, i-butanesulfonic acid, sec-butanesulfonic acid, t-butanesulfonic acid, n-pentanesulfonic acid, n-hexanesulfonic acid, n-octanesulfonic acid, cyclopentanesulfonic acid, and cyclohexanesulfonic acid; aromatic sulfonic acids such as benzenesulfonic acid, p-toluenesulfonic acid, benzylsulfonic acid, α-naphthalenesulfonic acid, and β-naphthalenesulfonic acid; 10-camphor sulfonic acid, and acids produced by bonding of a group —SO$_3$H to the bonding site of the group of any of the above formulas (7)-(13) can be given.

The following acids can be given as preferable examples of the acids (6) in the present invention: acetic acid, n-propionic acid, butyric acid, isobutyric acid, valeric acid, isovaleric acid, caproic acid, benzoic acid, salicylic acid, phthalic acid, terephthalic acid, α-naphthalenecarboxylic acid, β-naphthalenecarboxylic acid, cyclobutanecarboxylic acid, cyclopentanecarboxylic acid, cyclohexanecarboxylic acid, 1,1-cyclobutanedicarboxylic acid, 1,2-cyclobutanedicarboxylic acid, 1,1-cyclopentanedicarboxylic acid, 1,2-cyclopentanedicarboxylic acid, 1,3-cyclopentanedicarboxylic acid, 1,1-cyclohexanedicarboxylic acid, 1,2-cyclohexanedicarboxylic acid, 1,3-cyclohexanedicarboxylic acid, 1,4-cyclohexanedicarboxylic acid, 2-norbornanecarboxylic acid, 2,3-norbornanedicarboxylic acid, norbornyl-2-acetic acid, 1-adamantanecarboxylic acid, 1-adamantaneacetic acid, 1,3-adamantanedicarboxylic acid, 1,3-adamantanediacetic acid, lithocholic acid, deoxycholic acid, chenodeoxycholic acid, and cholic acid, as well as acids produced by bonding a group —COOH to the bonding site of the group of any of the formulas (7)-(13).

As examples of the onium salt compound generating the acid (3), acid (4), acid (5), or acid (6), diphenyliodonium salt, bis(4-t-butylphenyl)iodonium salt, triphenylsulfonium salt, 4-hydroxyphenyl-phenyl-methylsulfonium salt, cyclohexyl-2-oxocyclohexyl-methylsulfonium salt, dicyclohexyl-2-oxocyclohexylsulfonium salt, 2-oxocyclohexyldimethylsulfonium salt, 4-hydroxyphenyl-benzyl-methylsulfonium salt, 1-naphthyldimethylsulfonium salt, 1-naphthyldiethylsulfonium salt, 4-cyano-1-naphthyldimethylsulfonium salt, 4-cyano-1-naphthyldiethylsulfonium salt, 4-nitro-1-naphthyldimethylsulfonium salt, 4-nitro-1-naphthyldiethylsulfonium salt, 4-methyl-1-naphthyldimethylsulfonium salt, 4-methyl-1-naphthyldiethylsulfonium salt, 4-hydroxy-1-naphthyldimethylsulfonium salt, 4-hydroxy-1-naphthyldiethylsulfonium salt, 1-(4-hydroxynaphthalen-1-yl)tetrahydrothiophenium salt, 1-(4-methoxynaphthalen-1-yl)tetrahydrothiophenium salt, 1-(4-ethoxynaphthalen-1-yl)tetrahydrothiophenium salt, 1-(4-n-butoxynaphthalen-1-yl)tetrahydrothiophenium salt, 1-(4-methoxymethoxynaphthalen-1-yl)tetrahydrothiophenium salt, 1-(4-ethoxymethoxynaphthalen-1-yl)tetrahydrothiophenium salt, 1-[4-(1-methoxyethoxy)naphthalen-1-yl]tetrahydrothiophenium salt, 1-[4-(2-methoxyethoxy)naphthalen-1-yl]tetrahydrothiophenium salt, 1-(4-methoxycarbonyloxynaphthalen-1-yl)tetrahydrothiophenium salt, 1-(4-ethoxycarbonyloxynaphthalen-1-yl)tetrahydrothiophenium salt, 1-(4-n-propoxycarbonyloxynaphthalen-1-yl)tetrahydrothiophenium salt, 1-(4-i-propoxycarbonyloxynaphthalen-1-yl)tetrahydrothiophenium salt, 1-(4-n-butoxycarbonyloxynaphthalen-1-yl)tetrahydrothiophenium salt, 1-(4-t-butoxycarbonyloxynaphthalen-1-yl)tetrahydrothiophenium salt, 1-[4-(2-tetrahydrofuranyloxy)naphthalen-1-yl]tetrahydrothiophenium salt, 1-[4-(2-tetrahydropyranyloxy)naphthalen-1-yl]tetrahydrothiophenium salt, 1-(4-benzyloxynaphthalen-1-yl)tetrahydrothiophenium salt, and 1-[1-(1-naphthylacetomethyl)]tetrahydrothiophenium salt can be given.

As examples of sulfone compounds generating the acid (3), acid (4), or acid (5), β-ketosulfone, β-sulfonylsulfone, and α-diazo compounds of these compounds can be given.

As examples of the sulfonic acid compound generating the acid (3), acid (4), or acid (5), sulfonic acid esters, sulfonic acid imides, aryl sulfonic acid esters, and imino sulfonates can be given.

As examples of carboxylic acid compounds generating the acid (6), carboxylic acid ester, carboxylic acid imide, and carboxylic acid cyanate can be given.

As examples of the diazoketone compound generating the acid (3), acid (4), acid (5), or acid (6), 1,3-diketo-2-diazo compounds, diazobenzoquinone compounds, and diazonaphthoquinone compounds can be given.

As examples of halogen-containing compounds generating the acid (3), acid (4), acid (5), or acid (6), haloalkyl group-containing hydrocarbon compounds, and haloalkyl group-containing heterocyclic compounds can be given.

In the present invention, either the acid generator (C1) alone or a combination of the acid generator (C1) and the acid generator (C2) can be used as the acid generator (C). In the latter case, the acid generator (C2) may be blended at any optional proportion.

The blend ratio of the acid generator (C1) and the acid generator (C2) in the present invention is preferably from 100:0 to 100:150 (by weight).

In addition, as examples of the preferable acid generator other than the acid generator (C1) and the acid generator (C2) (hereinafter referred to as "the other acid generator"), other onium compounds such as diphenyliodonium pyrenesulfonate, diphenyliodonium n-dodecylbenzenesulfonate, diphenyliodonium hexafluoroantimonate, bis(4-t-butylphenyl)iodonium n-dodecylbenzenesulfonate, bis(4-t-butylphenyl)iodonium hexafluoroantimonate, bis(4-t-butylphenyl)iodonium naphthalenesulfonate, triphenylsulfonium hexafluoroantimonite, triphenylsulfonium naphthalenesulfonate, triphenylsulfonium 10-camphorsulfonate, 4-hydroxyphenyl-phenyl-methylsulfonium p-toluenesulfonate, 4-hydroxyphenyl-benzyl-methylsulfonium and p-toluenesulfonate; sulfone compounds such as 4-trisphenacylsulfone, mesitylphenacylsulfone, and bis(phenylsulfonyl)methane; sulfonic acid compounds such as benzointosylate and nitrobenzyl-9,10-diethoxyanthracene-2-sulfonate; diazoketone compounds such as 1,2-naphthoquinonediazido-4-sulfonyl chloride, 1,2-naphthoquinonediazido-5-sulfonyl chloride, 1,2-naphthoquinonediazido-4-sulfonate or 1,2-naphthoquinonediazido-5-sulfonate of 2,3,4,4'-tetrahydroxybenzophenone, and 1,2-naphthoquinonediazido-4-sulfonate or 1,2-naphthoquinonediazido-5-sulfonate of 1,1,1-tris(4-hydroxyphenyl)ethane; and other halogen-containing compounds such as (trichloromethyl)-s-triazine derivatives such as phenylbis(trichloromethyl)-s-triazine, 4-methoxyphenylbis(trichloromethyl)-s-triazine, and 1-naphthylbis(trichloromethyl)-s-triazine, and 1,1-bis(4-chlorophenyl)-2,2,2-trichloroethane; a disulfonyldiazomethane compound of the following formula (14),

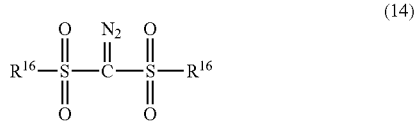

(14)

wherein $R^{16}$ individually represents a monovalent group such as an alkyl group, aryl group, halogenated alkyl group, and halogenated aryl group;

oxime sulfonate compounds of the following formulas (15-1) or (15-2),

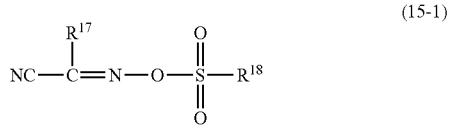

(15-1)

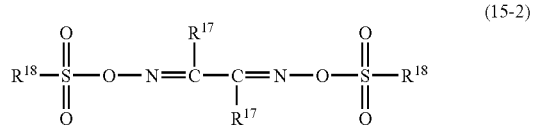

(15-2)

wherein $R^{17}$ and $R^{18}$ individually represent a monovalent organic group; and the like can be given.

As specific examples of the disulfonium diazomethane compound, bis(trifluoromethanesulfonyl)diazomethane, bis (cyclohexanesulfonyl)diazomethane, bis(benzenesulfonyl) diazomethane, bis(p-toluenesulfonyl)diazomethane, methanesulfonyl-p-toluenesulfonyldiazomethane, cyclohexanesulfonyl-1,1-dimethylethylsulfonyldiazomethane, bis(1,1-dimethyletanesulfonyl)diazomethane, bis (3,3-dimethyl-1,5-dioxaspiro[5.5]dodecane-8-sulfonyl)diazomethane, and bis(1,4-dioxaspiro[4.5]decane-7-sulfonyl) diazomethane can be given.

As specific examples of $R^{17}$ in the formulas (15-1) and (15-2), a methyl group, ethyl group, n-propyl group, phenyl group, tosyl group, trifluoromethyl group, and nonafluoro-n-butyl group can be given.

As specific examples of $R^{18}$, a phenyl group, tosyl group, and naphthyl group can be given.

As other preferable examples of the other acid generators, sulfonates of the following oxime compounds such as trifluoromethane sulfonate, nonafluoro-n-butane sulfonate, perfluoro-n-octane sulfonate, benzene sulfonate, p-toluene sulfonate, methane sulfonate, and n-butane sulfonate can be given.

As examples of the oxime compound, 2,2-difluoro-2-methylacetophenone-O-methylsulfonyloxime, 2,2-dichloro-2-methoxymethyl-2'-methylacetophenone-O-(n-propyl)sulfonyloxime, 2,2-difluoro-2-ethylacetophenone-O-(n-propyl)sulfonyloxime, 2,2-difluoro-2-phenylacetophenone-O-ethylsulfonyloxime, 2-chloro-2-fluoro-2-cyclohexylacetophenone-O-(p-tolyl)sulfonyloxime, 2,2-difluoro-2-(n-propyl)acetophenone-O-(10-camphor)sulfonyloxime, 2,2-difluoro-2-methyl-4'-methoxyacetophenone-O-(n-propyl)sulfonyloxime, 2,2-difluoro-2-methylacetonaphthone-O-trifluoromethylsulfonyloxime, 1,1-difluoro-1-phenylacetone-O-(n-butyl)sulfonyloxime, (1,1-difluoro-1-cyclohexyl)methyl-2'-thienylketone-O-methylsulfonyloxime, (1,1-dichloro-1-phenyl)methyl-2'-furylketone-O-(n-propyl)sulfonyloxime, 2,2-difluoro-2-methylcarbonylacetophenone-O-methylsulfonyloxime, 2,2-dichloro-2-methoxymethylcarbonyl-2'-methylacetophenone-O-(n-propyl) sulfonyloxime, 2,2-difluoro-2-ethylcarbonylacetophenone-O-(n-propyl) sulfonyloxime, 2,2-difluoro-2-phenylcarbonylacetophenone-O-ethylsulfonyloxime, 2-chloro-2-fluoro-2-cyclohexylcarbonylacetophenone-O-(p-tolyl)sulfonyloxime, 2,2-difluoro-2-(n-propylcarbonyl) acetophenone-O-(10-camphor)sulfonyloxime, 2,2-difluoro-2-methylcarbonyl-4'-methoxyacetophenone-O-(n-propyl) sulfonyloxime, 2,2-difluoro-2-methylcarbonylacetonaphthone-O-trifluoromethylsulfonyloxime, 1,1-difluoro-1-phenylcarbonylacetone-O-(n-butyl)sulfonyloxime, (1,1-difluoro-1-cyclohexylcarbonyl)methyl-2'-thienylketone-O-methylsulfonyloxime, (1,1-dichloro-1-phenylcarbonyl)methyl-2'-furylketone-O-(n-propyl)sulfonyloxime, 2,2-difluoro-2-methoxycarbonylacetophenone-O-methylsulfonyloxime, 2,2-difluoro-2-ethoxycarbonylacetophenone-O-(n-propyl)sulfonyloxime, 2,2-difluoro-2-phenoxycarbonylacetophenone-O-ethylsulfonyloxime, 2-chloro-2-fluoro-2-cyclohexyloxycarbonylacetophenone-O-(p-tolyl)sulfonyloxime, 2,2-difluoro-2-(n-propoxycarbonyl)acetophenone-O-(10-camphor) sulfonyloxime, 2,2-difluoro-2-methoxycarbonyl-4'-methoxyacetophenone-O-(n-propyl)sulfonyloxime, 2,2-difluoro-2-methoxycarbonylacetonaphthone-O- trifluoromethylsulfonyloxime, 1,1-difluoro-1-phenoxycarbonylacetone-O-(n-butyl)sulfonyloxime, (1,1-dichloro-1-cyclohexyloxycarbonyl)methyl-2'-thienylketone-O-methyl sulfonyloxime, (1,1-difluoro-1-phenoxycarbonyl)methyl-2'-furylketone-O-(n-propyl) sulfonyloxime, 2,2-difluoro-2-(N,N-dimethylamide)acetophenone-O-methylsulfonyloxime, 2,2-difluoro-2-(N-ethylamide)-2'-methyl-acetophenone-O-(n-propyl) sulfonyloxime, 2,2-difluoro-2-(N-phenylamide)acetophenone-O-ethylsulfonyloxime, 2-chloro-2-fluoro-2-(N-methyl-N-cyclohexylamide)acetophenone-O-(p-tolyl) sulfonyloxime, 2,2-difluoro-2-(n-propylamide)acetophenone-O-(10-camphor)sulfonyloxime, 2,2-difluoro-2-(N-methyl-N-cyclohexylamide)-4'-methoxyacetophenone-O-(n-propyl) sulfonyloxime, 2,2-difluoro-2-(N,N-dimethylamide)acetonaphthone-O-trifluoromethylsulfonyloxime, 1,1-difluoro-1-(N-phenylamide)acetone-O-(n-butyl)sulfonyloxime, [1,1-difluoro-1-(N-cyclohexylamide)]methyl-2'-thienylketone-O-methylsulfonyloxime, (1,1-dichloro-1-(N-phenylamide))methyl-2'-furylketone-O-(n-propyl)sulfonyloxime, 2,2-difluoro-2-thiomethoxyacetophenone-O-methylsulfonyloxime, 2,2-difluoro-2-thioethoxyacetophenone-O-(n-propyl)sulfonyloxime, 2,2-difluoro-2-thiophenoxyacetophenone-O-ethylsulfonyloxime, 2-chloro-2-fluoro-2-thiocyclohexyloxyacetophenone-O-(p-tolyl)sulfonyloxime, 2,2-difluoro-2-thiomethoxy-4'-methoxyacetophenone-O-(n-propyl)sulfonyloxime, 2,2-difluoro-2-thiomethoxyacetonaphthone-O-trifluoromethylsulfonyloxime, 1,1-difluoro-1-thiophenoxyacetone-O-(n-butyl)sulfonyloxime, (1,1-difluoro-1-thiocyclohexyloxy)methyl-2'-thienylketone-O-methylsulfonyloxime, (1,1-dichloro-1-thiophenoxy)methyl-2'-furylketone-O-(n-propyl)sulfonyloxime, 2,2-difluoro-2-methylsulfinylacetophenone-O-methylsulfonyloxime, 2,2-difluoro-2-ethylsulfinylacetophenone-O-(n-propyl) sulfonyloxime, 2,2-difluoro-2-phenylsulfinylacetophenone-O-ethylsulfonyloxime, 2-chloro-2-fluoro-2-cyclohexylsulfinylacetophenone-O-(p-tolyl)sulfonyloxime, 2,2-difluoro-2-(n-propylsulfinyl)acetophenone-O-(10-camphor)sulfonyloxime, 2,2-difluoro-2-methylsulfinyl-4'-methoxyacetophenone-O-(n-propyl)sulfonyloxime, 2,2-difluoro-2-methylsulfinylacetonaphthone-O-trifluoromethylsulfonyloxime, 1,1-difluoro-1-phenylsulfinylacetone-O-(n-butyl)sulfonyloxime, (1,1-difluoro-1-cyclohexylsulfinyl)methyl-2'-thienylketone-O-methylsulfonyloxime, (1,1-dichloro-1-phenylsulfinyl)methyl-2'-furylketone-O-(n-propyl)sulfonyloxime, 2,2-difluoro-2-phenylsulfonylacetophenone-O-(n-propyl) sulfonyloxime, 2,2-difluoro-2-phenylsulfonylacetophenone-O-methylsulfonyloxime, 2,2-difluoro-2-phenylsulfonylacetophenone-O-ethylsulfonyloxime, 2,2-dichloro-2-phenylsulfonylacetophenone-O-methylsulfonyloxime, 2,2-difluoro-2-phenylsulfonylacetophenone-O-(10-camphor)sulfonyloxime, 2,2-difluoro-2-phenylsulfonylacetophenone-O-(p-tolyl)sulfonyloxime, 2,2-difluoro-2-phenylsulfonylacetophenone-O-trifluoromethylsulfonyloxime, 2,2-difluoro-2-phenylsulfonyl-4'-methoxyacetophenone-O-(n-propyl)sulfonyloxime, 2,2-difluoro-2-phenylsulfonyl-4'-methoxyacetophenone-O-methylsulfonyloxime, 2,2-difluoro-2-phenylsulfonyl-4'-methoxyacetophenone-O-ethylsulfonyloxime, 2,2-dichloro-2-phenylsulfonyl-4'-methoxyacetophenone-O-methylsulfonyloxime, 2,2-difluoro-2-phenylsulfonyl-4'-methoxyacetophenone-O-(10-camphor)sulfonyloxime, 2,2-difluoro-2-phenylsulfonyl-4'-methoxyacetophenone-O-(p-tolyl)sulfonyloxime, 2,2-difluoro-2-phenylsulfonyl-4'-methoxyacetophenone-O-trifluoromethyl sulfonyloxime, 2,2-difluoro-2-phenylsulfonyl-2'-methylacetophenone-O-(n-propyl)sulfonyloxime, 2,2-difluoro-2-phenylsulfonyl-2'-methylacetophenone-O-methylsulfonyloxime, 2,2-difluoro-2-phenylsulfonyl-2'-methylacetophenone-O-ethylsulfonyloxime, 2,2-dichloro-2-phenylsulfonyl-2'-methylacetophenone-O-methylsulfonyloxime, 2,2-difluoro-2-phenylsulfonyl-2'-methylacetophenone-O-camphorsulfonyloxime, 2,2-difluoro-2-cyclohexylsulfonylacetophenone-O-(n-propyl)sulfonyloxime, 2,2-difluoro-2-cyclohexylsulfonylacetophenone-O-methylsulfonyloxime, 2,2-difluoro-2-cyclohexylsulfonylacetophenone-O-ethylsulfonyloxime, 2,2-dichloro-2-cyclohexylsulfonylacetophenone-O-methylsulfonyloxime, 2,2-difluoro-2-cyclohexylsulfonylacetophenone-O-(10-camphor)sulfonyloxime, 2,2-difluoro-2-cyclohexylsulfonylacetophenone-O-trifluoromethylsulfonyloxime, 2,2-difluoro-2-methylsulfonyl-4'-methoxyacetophenone-O-(n-propyl) sulfonyloxime, 2,2-difluoro-2-methylsulfonyl-4'-methoxyacetophenone-O-methylsulfonyloxime, 2,2-difluoro-2-methylsulfonyl-4'-methoxyacetophenone-O-ethylsulfonyloxime, 2,2-dichloro-2-methylsulfonyl-4'-methoxyacetophenone-O-methylsulfonyloxime, 2,2-difluoro-2-methylsulfonyl-4'-methoxyacetophenone-O-(10-camphor)sulfonyloxime, 2,2-difluoro-2-methylsulfonyl-4'-methoxyacetophenone-O-trifluoromethyl sulfonyloxime, 2,2-dibromo-2-phenylsulfonylacetophenone-O-(10-camphor)sulfonyloxime, 2-chloro-2-fluoro-2-phenylsulfonylacetophenone-O-ethylsulfonyloxime, 2-chloro-2-fluoro-2-phenylsulfonylacetophenone-O-benzylsulfonyloxime, 2,2-difluoro-2-phenylsulfonylacetophenone-O-(1-naphthyl) sulfonyloxime, 2,2-dichloro-2-methylsulfonylacetophenone-O-(p-bromophenyl) sulfonyloxime, 2,2-difluoro-2-phenylsulfonylacetophenone-O-(2-thienyl)sulfonyloxime, 2,2-difluoro-2-cyclohexylsulfonyl-2'-cyanoacetophenone-O-ethylsulfonyloxime, 2,2-difluoro-2-ethylsulfonylacetophenone-O-(n-propyl)sulfonyloxime, 2,2-difluoro-2-(n-propylsulfonyl)acetophenone-O-(10-camphor) sulfonyloxime, 2,2-difluoro-2-methylsulfonylacetonaphthone-O-trifluoromethylsulfonyloxime, 1,1-difluoro-1-phenylacetone-O-(n-butyl)sulfonyloxime, (1,1-difluoro-1-cyclohexyl)methylsulfonyl-2'-thienylketone-O-methylsulfonyloxime, (1,1-dichloro-1-phenyl)methylsulfonyl-2'-furylketone-O-(n-propyl)sulfonyloxime, 2,2-difluoro-2-cyanoacetophenone-O-methylsulfonyloxime, 2,2-dichloro-2-cyano-2'-methylacetophenone-O-(n-propyl) sulfonyloxime, 2,2-difluoro-2-cyanoacetophenone-O-ethylsulfonyloxime, 2-chloro-2-fluoro-2-cyanoacetophenone-O-(p-tolyl)sulfonyloxime, 2,2-difluoro-2-cyanoacetophenone-O-(10-camphor)sulfonyloxime, 2,2-difluoro-2-cyano-4'-methoxyacetophenone-O-(n-propyl)sulfonyloxime, 2,2-difluoro-2-cyanoacetonaphthone-O-trifluoromethylsulfonyloxime, 1,1-difluoro-1-cyanoacetone-O-(n-butyl)sulfonyloxime, (1,1-difluoro-1-cyano)methyl-2'-thienylketone-O-methylsulfonyloxime, (1,1-dichloro-1-cyano)methyl-2'-furylketone-O-(n-propyl) sulfonyloxime, 2,2-difluoro-2-nitroacetophenone-O-methylsulfonyloxime, 2,2-dichloro-2-nitro-2'-methylacetophenone-O-(n-propyl)sulfonyloxime, 2,2-difluoro-2-nitroacetophenone-O-ethylsulfonyloxime, 2-chloro-2-fluoro-2-nitroacetophenone-O-(p-tolyl)sulfonyloxime, 2,2-difluoro-2-nitroacetophenone-O-(10-camphor) sulfonyloxime, 2,2-difluoro-2-nitro-4'- methoxyacetophenone-O-(n-propyl)sulfonyloxime, 2,2-difluoro-2-nitroacetonaphthone-O-trifluoromethylsulfonyloxime, 1,1-difluoro-1-nitroacetone-O-(n-butyl)sulfonyloxime, (1,1-difluoro-1-nitro)methyl-2'-thienylketone-O-methylsulfonyloxime, (1,1-dichloro-1-nitro)methyl-2'-furylketone-O-(n-propyl)sulfonyloxime, 2,2-dioxo-5-phenylsulfonyldifluoromethyl-3H,4H-1,2,5-oxathioazine, 2,2-dioxo-4,4-difluoro-5-phenyl-3H-1,2,5-oxathioazine, 1,1-dioxo-2,2-difluoro-3-(n-propylsulfonyloxyimino)thiain, 2,2-difluoro-1,3-di(phenylsulfonyl)-1,3-propandial-O-(n-propylsulfonyl)dioxime, 1,1,5,5-tetrafluoro-1,5-di(methylsulfonyl)-2,4-pentandione-O,O-di(methylsulfonyl) dioxime, bis(2',2'-difluoro-2'-cyanoacetophenonoxime-O-1,4-benzenesulfonate, 1,4-bis[1'-(n-propylsulfonyloxyimino)-2',2'-difluoro-2'-(methylsulfonyl)ethyl]benzene, 1,1,4,4-tetrafluoro-1,4-di(methylsulfonyl)-2,3-butandione-O,O-di(methylsulfonyl) dioxime, and the like can be given.

In the present invention, although the other acid generator can be used alone as the acid generator (C), combined use of the other acid generator with the acid generator (C1) or further with the acid generator (C2) is also preferable.

In the present invention, the acid generator (C) may be used either individually or in combination of two or more.

The amount of the acid generator (C) is usually 0.1-30 parts by weight, and preferably 0.5-20 parts by weight for 100 parts by weight of the total resin components from the viewpoint of ensuring sensitivity and developability as a resist. If the amount of the acid generator (C) is less than 0.1 part by weight, sensitivity and developability of the resulting resist may be decreased. If the amount exceeds 30 parts by weight, it may be difficult to obtain a rectangular resist pattern due to a decrease in transparency to radiation.

(Additives)

Additives such as an acid diffusion controller, dissolution controller, and surfactant may be added to the radiation-sensitive resin composition of the present invention.

The acid diffusion controllers control diffusion of an acid generated from the acid generator upon exposure in the resist film to suppress undesired chemical reactions in the unexposed area.

The addition of such an acid diffusion controller improves storage stability of the resulting radiation-sensitive resin composition and resolution as a resist. Moreover, the addition of the acid diffusion controller prevents the line width of the resist pattern from changing due to changes in the post-exposure delay (PED) between exposure and development, whereby a composition with remarkably superior process stability can be obtained.

As the acid diffusion controller, nitrogen-containing organic compounds of which the basicity does not change due to exposure or heat treatment during formation of a resist pattern are preferable.

As examples of such nitrogen-containing organic compounds, a compound of the following formula (16) (hereinafter called "acid diffusion controller (D)") can be given,

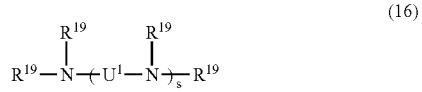

(16)

wherein $R^{19}$ individually represents a hydrogen atom, a linear, branched, or cyclic alkyl group, aryl group, or aralkyl group which are either substituted or unsubstituted with a functional group such as a hydroxyl group, $U^1$ is a divalent organic group, and s is an integer of 0-2.

In the acid diffusion controller (D), the compound having s=0 is defined as a nitrogen-containing compound (D1) and the compound having s=1 or 2 is defined as a nitrogen-containing compound (D2). Polyamino compounds and polymers having three or more nitrogen atoms are collectively referred to as "nitrogen-containing compound (D3)".

As examples of nitrogen-containing organic compounds other than the acid diffusion controller (D), quaternary ammonium hydroxide compounds, amide group-containing compounds, urea compounds, and nitrogen-containing heterocyclic compounds can be given.

As examples of the nitrogen-containing compound (D1), mono(cyclo)alkylamines such as n-hexylamine, n-heptylamine, n-octylamine, n-nonylamine, n-decylamine, and cyclohexylamine; di(cyclo)alkylamines such as di-n-butylamine, di-n-pentylamine, di-n-hexylamine, di-n-heptylamine, di-n-octylamine, di-n-nonylamine, di-n-decylamine, cyclohexylmethylamine, and dicyclohexylamine; tri(cyclo)alkylamines such as triethylamine, tri-n-propylamine, tri-n-butylamine, tri-n-pentylamine, tri-n-hexylamine, tri-n-heptylamine, tri-n-octylamine, tri-n-nonylamine, tri-n-decylamine, cyclohexyldimethylamine, dicyclohexylmethylamine, and tricyclohexylamine; aromatic amines such as aniline, N-methylaniline, N,N-dimethylaniline, 2-methylaniline, 3-methylaniline, 4-methylaniline, 4-nitroaniline, 2,6-dimethylaniline, 2,6-diisopropylaniline, diphenylamine, triphenylamine, and naphthylamine; and the like can be given.

Examples of the nitrogen-containing compound (D2) include ethylenediamine, N,N,N',N'-tetramethylethylenediamine, N,N,N',N'-tetrakis(2-hydroxypropyl)ethylenediamine, tetramethylenediamine, 1,3-bis[1-(4-aminophenyl)-1-methylethyl]benzenetetramethylenediamine, hexamethylenediamine, 4,4'-diaminodiphenylmethane, 4,4'-diaminodiphenyl ether, 4,4'-diaminobenzophenone, 4,4'-diaminodiphenylamine, 2,2-bis(4-aminophenyl)propane, 2-(3-aminophenyl)-2-(4-aminophenyl)propane, 2-(4-aminophenyl)-2-(3-hydroxyphenyl)propane, 2-(4-aminophenyl)-2-(4-hydroxyphenyl)propane, 1,4-bis[1-(4-aminophenyl)-1-methylethyl]benzene, 1,3-bis[1-(4-aminophenyl)-1-methylethyl]benzene, bis(2-dimethylaminoethyl)ether, and bis(2-diethylaminoethyl)ether.

Examples of the nitrogen-containing compounds (D3) include polyethyleneimine, polyallylamine, and a polymer of 2-dimethylaminoethylacrylamide.

As examples of the quaternary ammonium hydroxide compound, tetramethylammonium hydroxide, tetraethylammonium hydroxide, tetra-n-propylammonium hydroxide, and tetra-n-butylammonium hydroxide can be given.

Examples of the amide group-containing compound include, in addition to N-t-butoxycarbonyl group-containing amino compounds such as N-t-butoxycarbonyl di-n-octylamine, N-t-butoxycarbonyl di-n-nonylamine, N-t-butoxycarbonyl di-n-decylamine, N-t-butoxycarbonyl dicyclohexylamine, N-t-butoxycarbonyl-1-adamantylamine, N-t-butoxycarbonyl-N-methyl-1-adamantylamine, N,N-di-t-butoxycarbonyl-1-adamantylamine, N,N-di-t-butoxycarbonyl-N-methyl-1-adamantylamine, N-t-butoxycarbonyl-4,4'-diaminodiphenylmethane, N,N'-di-t-butoxycarbonylhexamethylenediamine, N,N,N'N'-tetra-t-butoxycarbonylhexamethylenediamine, N,N'-di-t-butoxycarbonyl-1,7-diaminoheptane, N,N'-di-t-butoxycarbonyl-1,8-diaminooctane, N,N'-di-t-butoxycarbonyl-1,9-diaminononane, N,N'-di-t-butoxycarbonyl-1,10-diaminodecane, N,N'-di-t- butoxycarbonyl-1,12-diaminododecane, N,N'-di-t-butoxycarbonyl-4,4'-diaminodiphenylmethane, N-t-butoxycarbonylbenzimidazole, N-t-butoxycarbonyl-2-methylbenzimidazole, and N-t-butoxycarbonyl-2-phenylbenzimidazole, formamide, N-methylformamide, N,N-dimethylformamide, acetamide, N-methylacetamide, N,N-dimethylacetamide, propionamide, benzamide, pyrrolidone, and N-methylpyrrolidone.

As examples of the urea compound, urea, methylurea, 1,1-dimethylurea, 1,3-dimethylurea, 1,1,3,3-tetramethylurea, 1,3-diphenylurea, and tri-n-butylthiourea can be given.

Examples of the nitrogen-containing heterocyclic compounds include: imidazoles such as imidazole, 4-methylimidazole, 1-benzyl-2-methylimidazole, 4-methyl-2-phenylimidazole, benzimidazole, and 2-phenylbenzimidazole; pyridines such as pyridine, 2-methylpyridine, 4-methylpyridine, 2-ethylpyridine, 4-ethylpyridine, 2-phenylpyridine, 4-phenylpyridine, 2-methyl-4-phenylpyridine, nicotine, nicotinic acid, nicotinamide, quinoline, 4-hydroxyquinoline, 8-oxyquinoline, and acridine; piperazines such as piperazine and 1-(2-hydroxyethyl)piperazine; pyrazine, pyrazole, pyridazine, quinoxaline, purine, pyrrolidine, piperidine, 3-piperidino-1,2-propanediol, morpholine, 4-methylmorpholine, 1,4-dimethylpiperazine, and 1,4-diazabicyclo[2.2.2]octane.

These acid diffusion controllers may be used either individually or in combinations of two or more.

The amount of the acid diffusion controller to be added is usually 100 mol % or less, preferably 50 mol % or less, and still more preferably 30 mol % or less, of the acid generator (C). If the amount of the acid diffusion controller exceeds 100 mol %, sensitivity of the resulting resist and developability of the exposed region may decrease. If the amount of the acid diffusion controller is less than 0.1 mol %, the pattern shape or dimensional accuracy of the resulting resist may decrease depending on the process conditions.

As examples of the dissolution controller, a compound of the following formula (17) (hereinafter referred to as "dissolution controller (E1)"), a compound of the following formula (18) (hereinafter referred to as "dissolution controller (E2)"), a polyketone having a recurring unit of the following formula (20) (hereinafter referred to as "dissolution controller (E3)"), and a polyspiroketal having a recurring unit of the following formula (21) (hereinafter referred to as "dissolution controller (E4)") can be given. A more preferable dissolution controller is a compound selected from the group consisting of dissolution controllers (E1) and the dissolution controllers (E2) and/or a compound selected from the group consisting of dissolution controllers (E3) and the dissolution controllers (E4). The addition of such a dissolution controller ensures appropriate control of the dissolution contrast and the dissolution rate of the resist.

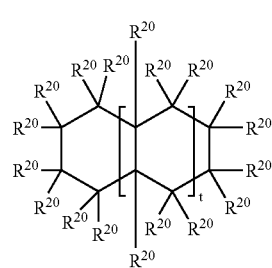

(17)

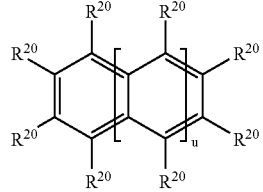

(18)

wherein $R^{20}$ individually represents a hydrogen atom, fluorine atom, linear or branched alkyl group having 1-10 carbon atoms, linear or branched fluoroalkyl group having 1-10 carbon atoms, or a group represented by the following formula (19),

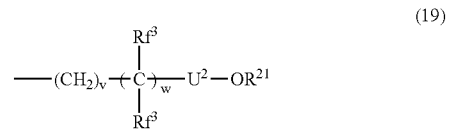

(19)

wherein $Rf^3$ individually represents a hydrogen atom, methyl group, or trifluoromethyl group, $U^2$ is a single bond, a methylene group, cyclohexylene group, or phenylene group, $R^{21}$ represents a hydrogen atom or a monovalent organic group dissociable with an acid to produce hydrogen atoms, v is an integer of 0-3, and w is 0 to 1, at least one of $R^{20}$ being a group shown by the formula (19), and t and u are individually an integer of 0-2.

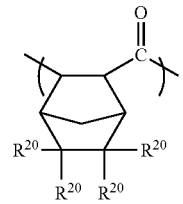

(20)

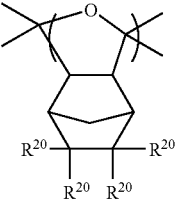

(21)

wherein $R^{20}$ is the same as defined for the above formulas (17) and (18).

As examples of the linear or branched alkyl group having 1-10 carbon atoms represented by $R^{20}$ in the formula (19), (20), (22), or (23), a methyl group, ethyl group, n-propyl group, i-propyl group, n-butyl group, i-butyl group, sec-butyl group, t-butyl group, n-pentyl group, n-hexyl group, n-heptyl group, n-octyl group, n-nonyl group, and n-decyl group can be given.

As examples of the linear or branched fluoroalkyl group having 1-10 carbon atoms represented by $R^{20}$, a fluoromethyl group, difluoromethyl group, trifluoromethyl group, pentafluoroethyl group, heptafluoro-n-propyl group, heptafluoro-1-propyl group, nonafluoro-n-butyl group, perfluoro-n-pentyl group, perfluoro-n-hexyl group, perfluoro-n-heptyl group, perfluoro-n-octyl group, perfluoro-n-nonyl group, and perfluoro-n-decyl group can be given.

The two bonding sites in the cyclohexylene group and phenylene group represented by $U^2$ in the group of the above formula (19) representing the $R^{20}$ group may be 1,2-, 1,3-, or 1,4-positions.

As examples of the monovalent organic group dissociable with an acid to produce hydrogen atoms represented by $R^{21}$, organocarbonyl groups such as a t-butoxycarbonyl group, methoxycarbonyl group, ethoxycarbonyl group, i-propoxycarbonyl group, 9-fluorenylmethylcarbonyl group, 2,2,2-trichloroethylcarbonyl group, 2-(trimethylsilyl)ethylcarbonyl group, i-butylcarbonyl group, vinylcarbonyl group, allylcarbonyl group, benzylcarbonyl group, 4-ethoxy-1-naphthylcarbonyl group, and methyldithiocarbonyl group; alkyl-substituted alicyclic group such as a 1-methylcyclopentyl group, 1-ethylcyclopentyl group, 1-methylcyclohexyl group, 1-ethylcyclohexyl group, 2-methyladamantan-2-yl group, 2-ethyladamantan-2-yl group, 2-methylbicyclo[2.2.1]heptan-2-yl group, and 2-ethylbicyclo[2.2.1]heptan-2-yl group; organic groups bonding to the oxygen atom in the formula (19) to form an acetal structure such as a methoxymethyl group, methylthiomethyl group, ethoxymethyl group, ethylthiomethyl group, t-butoxymethyl group, t-butylthiomethyl group, (phenyldimethylsilyl)methoxymethyl group, benzyloxymethyl group, t-butoxymethyl group, siloxymethyl group, 2-methoxyethoxymethyl group, 2,2,2-trichloroethoxymethyl group, bis(2-chloroethoxy)methyl group, 2-(trimethylsilyl)ethoxymethyl group, 1-methoxycyclohexyl group, tetrahydropyranyl group, 4-methoxytetrahydropyranyl group, tetrahydrofuranyl group, tetrahydrothiopyranyl group, tetrahydrothiofuranyl group, 1-methoxyethyl group, 1-ethoxyethyl group, 1-(2-chloroethoxy)ethyl group, 1-methyl-1-methoxyethyl group, 1-methyl-1-benzyloxyethyl group, 1-(2-chloroethoxy)ethyl group, 1-methyl-1-benzyloxy-2-fluoroethyl group, 2,2,2-trichloroethyl group, 2-trimethylsilylethyl group, and 2-(phenylselenyl)ethyl group; alkylsilyl groups such as a trimethylsilyl group, ethyldimethylsilyl group, triethylsilyl group, i-propyldimethylsilyl group, i-propyldiethylsilyl group, tri-i-propylsilyl group, t-butyldimethylsilyl group, t-butyldiphenylsilyl group, tribenzylsilyl group, tri-p-xylylsilyl group, methyldiphenylsilyl group, triphenylsilyl group, and t-butylmethoxyphenylsilyl group; and the like can be given.

Of these monovalent organic groups dissociable with an acid to produce hydrogen atoms, t-butoxycarbonyl group, methoxymethyl group, ethoxymethyl group, 1-methoxyethyl group, 1-ethoxyethyl group, and the like are preferable.

As preferable examples of the dissolution controller (E1), compounds shown by the following formulas (E1-1) to (E1-4) can be given.

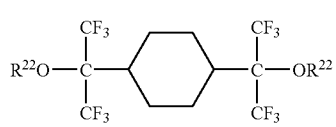

(E1-1)

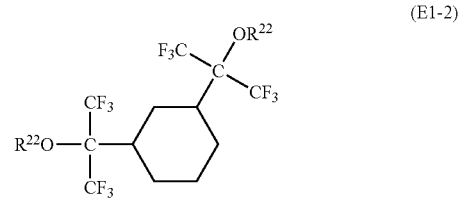

(E1-2)

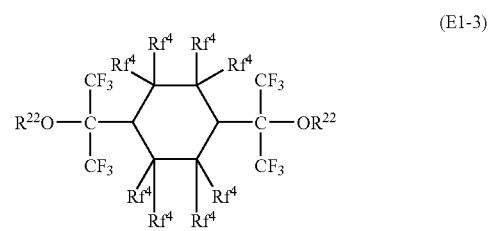

(E1-3)

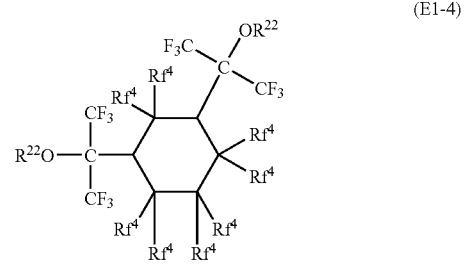

(E1-4)

In formulas (E1-1) to (E1-4), $R^{22}$ individually represents a hydrogen atom, t-butoxycarbonyl group, methoxymethyl group, ethoxymethyl group, 1-methoxyethyl group, or 1-ethoxyethyl group and $Rf^4$ individually represents a hydrogen atom, fluorine atom, or trifluoromethyl group, provided that eight $Rf^4$ groups in the formula (E1-3) or (E1-4) cannot be a hydrogen atom at the same time.

As preferable examples of the dissolution controller (E2), compounds shown by the following formulas (E2-1) to (E2-5) can be given.

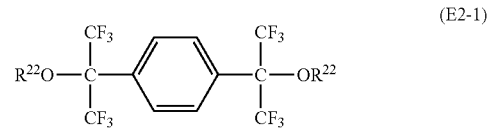

(E2-1)

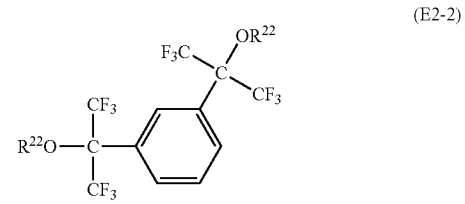

(E2-2)

-continued

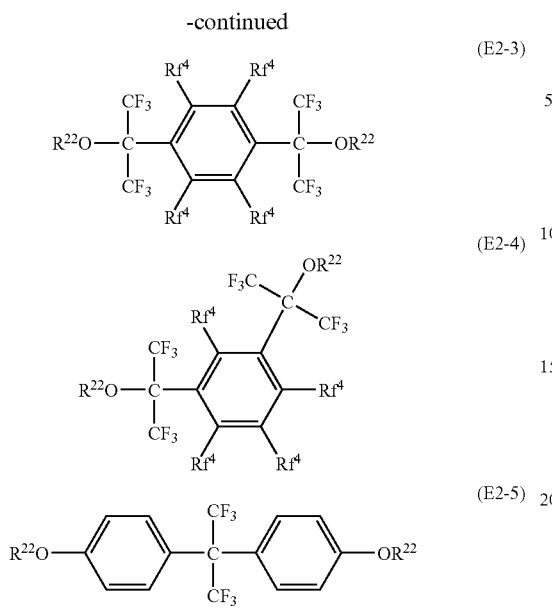

(E2-3)

(E2-4)

(E2-5)

In the formulas (E2-1) to (E2-5), $R^{22}$ and $Rf^4$ are respectively the same as those defined in the above formulas (E1-1) to (E1-4), provided that four $Rf^4$ groups in the formula (E2-3) or (E2-4) cannot be a hydrogen atom at the same time.

As the dissolution controller (E1), the compounds of the following formula (E1-1-1), formula (E1-1-2), formula (E1-2-1), and formula (E1-2-2), for example, are more preferable. As the dissolution controller (E2), the compounds of the following formula (E2-1-1), formula (E2-1-2), formula (E2-2-1), formula (E2-2-2), and formula

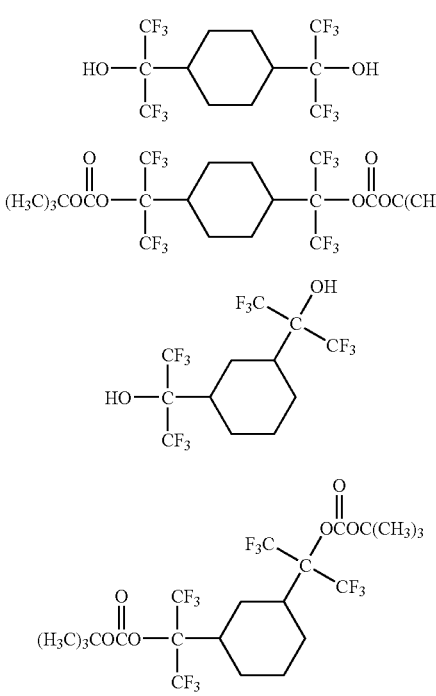

(E1-1-1)

(E1-1-2)

(E1-2-1)

(E1-2-2)

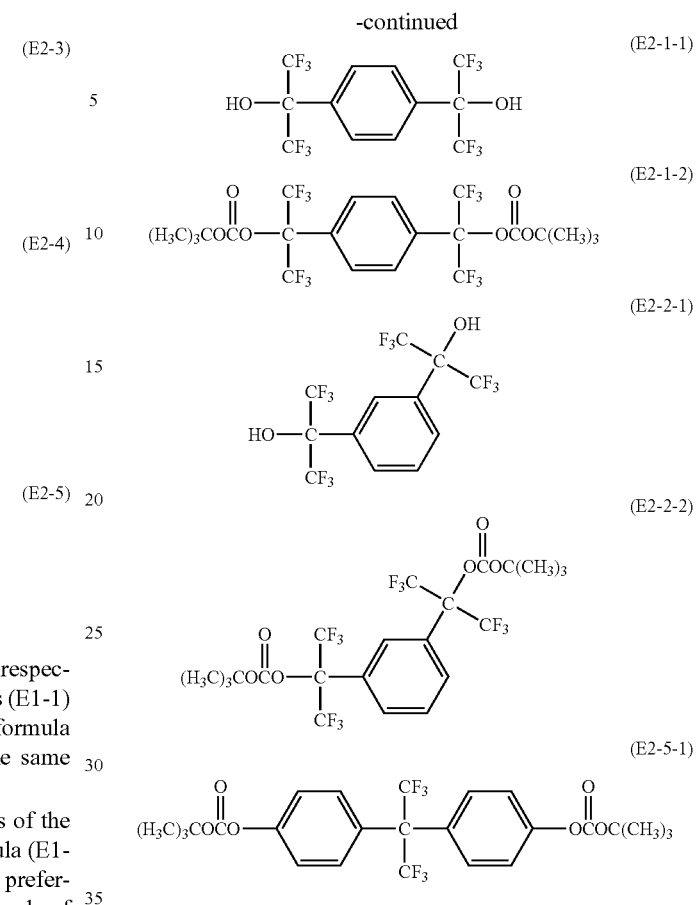

(E2-1-1)

(E2-1-2)

(E2-2-1)

(E2-2-2)

(E2-5-1)

As the dissolution controller (E4), a polyspiroketal having a recurring unit of the following formula (E4-1) is more preferable.

(E4-1)

The polyketone used as a dissolution controller (E3) and the polyspiroketal used as a dissolution controller (E4) have an Mw usually of 300-100,000, and preferably 800-3,000.

The amount of the dissolution controllers to be added is 50 parts by weight or less, and preferably 30 parts by weight or less for 100 parts by weight of the total resin component. If the amount of the dissolution controllers exceeds 50 parts by weight, heat resistance as a resist tends to decrease.

The surfactant improves applicability, striation, developability, and the like of the radiation-sensitive resin composition.

As examples of the surfactant, nonionic surfactants such as polyoxyethylene lauryl ether, polyoxyethylene stearyl ether, polyoxyethylene oleyl ether, polyoxyethylene n-octyl phenyl ether, polyoxyethylene n-nonyl phenyl ether, polyethylene glycol dilaurate, and polyethylene glycol distearate; and commercially available products such as KP341 (manufactured by Shin-Etsu Chemical Co., Ltd.), POLYFLOW No. 75, No. 95 (manufactured by Kyoeisha Chemical Co., Ltd.), FTOP EF301, EF303, EF352 (manufactured by Tohkem Products Corporation), MEGAFAC F171, F173 (manufactured by Dainippon Ink and Chemicals, Inc.), Fluorad FC430, FC431 (manufactured by Sumitomo 3M Ltd.), Asahi Guard AG710, and Surflon S-382, SC-101, SC-102, SC-103, SC-104, SC-105, SC-106 (manufactured by Asahi Glass Co., Ltd.) can be given.

The surfactants may be used either individually or in combination of two or more.

The amount of the surfactants to be added is usually 2 parts by weight or less for 100 parts by weight of the total resin component.

As other additives, halation inhibitors, adhesion promoters, storage stabilizers, anti-foaming agents, and the like can be given.

Preparation of Composition Solution

The radiation sensitive resin composition of the present invention is made into a composition solution by dissolving the composition in a solvent so that the total solid content is usually 1-25 wt %, and preferably 2-15 wt %, and filtering the solution using a filter with a pore diameter of about 0.2 µm, for example.

As examples of solvents used for preparation of the composition solution, linear or branched ketones such as 2-butanone, 2-pentanone, 3-methyl-2-butanone, 2-hexanone, 4-methyl-2-pentanone, 3-methyl-2-pentanone, 3,3-dimethyl-2-butanone, 2-heptanone, and 2-octanone; cyclic ketones such as cyclopentanone, 3-methylcyclopentanone, cyclohexanone, 2-methylcyclohexanone, 2,6-dimethylcyclohexanone, and isophorone; propylene glycol monoalkyl ether acetates such as propylene glycol monomethyl ether acetate, propylene glycol monoethyl ether acetate, propylene glycol mono-n-propyl ether acetate, propylene glycol mono-i-propyl ether acetate, propylene glycol mono-n-butyl ether acetate, propylene glycol mono-1-butyl ether acetate, propylene glycol mono-sec-butyl ether acetate, and propylene glycol mono-t-butyl ether acetate; alkyl 2-hydroxypropionates such as methyl 2-hydroxypropionate, ethyl 2-hydroxypropionate, n-propyl 2-hydroxypropionate, i-propyl 2-hydroxypropionate, n-butyl 2-hydroxypropionate, i-butyl 2-hydroxypropionate, sec-butyl 2-hydroxypropionate, and t-butyl 2-hydroxypropionate; alkyl 3-alkoxypropionates such as methyl 3-methoxypropionate, ethyl 3-methoxypropionate, methyl 3-ethoxypropionate, and ethyl 3-ethoxypropionate; fluorine-containing solvents, for example, fluorine-containing alcohols such as 2,3-difluorobenzyl alcohol, 2,2,2-trifluoroethanol, 1,3-difluoro-2-propanol, 1,1,1-trifluoro-2-propanol, 3,3,3-trifluoro-1-propanol, 2,2,3,3,4,4,4-heptafluoro-1-butanol, 2,2,3,3,4,4,5,5-octafluoro-1-pentanol, 3,3,4,4,5,5,5-heptafluoro-2-pentanol, 1H,1H-perfluoro-1-octanol, 1H,1H,2H,2H-perfluoro-1-octanol, 1H,1H,9H-perfluoro-1-nonanol, 1H,1H,2H,3H,3H-perfluorononane-1,2-diol, 1H,1H,2H,2H-perfluoro-1-decanol, and 1H,1H,2H,3H,3H-perfluoroundecane-1,2-diol; fluorine-containing esters such as 2,2,2-trifluoroethyl butyrate, ethylheptafluoro butyrate, heptafluorobutylethyl acetate, ethyl hexafluoroglutarate, ethyl-3-hydroxy-4,4,4-trifluorobutyrate, ethyl-2-methyl-4,4,4-trifluoro acetoacetate, ethylpentafluorobenzoate, ethylpentafluoropropionate, pentafluoroethylpropionate, ethylperfluorooctanoate, ethyl-4,4,4-trifluoroacetoacetate, ethyl-4,4,4-trifluorobutyrate, ethyl-4,4,4-trifluorocrotonate, ethyltrifluorosulfonate, ethyl-3-(trifluoromethyl)butyrate, ethyltrifluoropyrubate, ethyltrifluoroacetate, isopropyl-4,4,4-trifluoroacetoacetate, methylperfluorodecanoate, methylperfluoro(2-methyl-3-oxahexanoate), methylperfluorononanoate, methylperfluorooctanoate, methyl-2,3,3,3-tetrafluoropropionate, methyltrifluoroacetoacetate, methyltrifluoroacetoacetate, methyl perfluoro(2,5,8-trimethyl-3,6,9-trioxadodecanoate), propylene glycol trifluoromethyletheracetate, propylene glycol methyl ether trifluoromethylacetate, n-butyl trifluoromethylacetate, methyl 3-trifluoromethoxypropionate, 1,1,1-trifluoro-2-propylacetate, and n-butyl trifluoroacetate; fluorine-containing ethers such as 2-fluoroanisole, 3-fluoroanisole, 4-fluoroanisole, 2,3-difluoroanisole, 2,4-difluoroanisole, 2,5-difluoroanisole, 5,8-difluoro-1,4-benzodioxane, trifluoroacetaldehyde ethyl hemiacetal, 2H-perfluoro(5-methyl-3,6-dioxanenonane), 2H-perfluoro(5,8,11,14-tetramethyl-3,6,9,12,15-pentaoxaoctadecane), tetrahydrofuran(perfluoro-n-butyl), perfluoro(n-butyltetrahydrofuran), and propylene glycol trifluoromethyl ether; fluorine-containing ketones such as 2,4-difluoropropiophenone, fluorocyclohexane, 1,1,1,2,2,3,3-heptafluoro-7,7-dimethyl-4,6-octane dione, 1,1,1,3,5,5,5-heptafluoropentane-2,4-dione, 3,3,4,4,5,5,5-heptafluoro-2-pentanone, 1,1,1,2,2,6,6,6-octafluoro-2,4-hexane dione, trifluorobutanol-1,1,1-trifluoro-5-methyl-2,4-hexane dione, and perfluorocyclohexanone; fluorine-containing amines such as trifluoroacetamide, perfluorotributylamine, perfluorotrihexylamine, perfluorotripentylamine, and perfluorotripropylamine; fluorine-substituted cyclic hydrocarbons such as 2,4-difluorotoluene, perfluorodecalin, perfluoro(1,2-dimethylcyclohexane), and perfluoro(1,3-dimethylcyclohexane); and other solvents such as n-propyl alcohol, i-propyl alcohol, n-butyl alcohol, t-butyl alcohol, cyclohexanol, ethylene glycol monomethyl ether, ethylene glycol monoethyl ether, ethylene glycol mono-n-propyl ether, ethylene glycol mono-n-butyl ether, diethylene glycol dimethyl ether, diethylene glycol diethyl ether, diethylene glycol di-n-propyl ether, diethylene glycol di-n-butyl ether, ethylene glycol monomethyl ether acetate, ethylene glycol monoethyl ether acetate, ethylene glycol mono-n-propyl ether acetate, propylene glycol monomethyl ether, propylene glycol monoethyl ether, propylene glycol mono-n-propyl ether, toluene, xylene, ethyl 2-hydroxy-2-methylpropionate, ethyl ethoxyacetate, ethyl hydroxyacetate, methyl 2-hydroxy-3-methylbutyrate, 3-methoxybutylacetate, 3-methyl-3-methoxybutylacetate, 3-methyl-3-methoxybutylpropionate, 3-methyl-3-methoxybutylbutyrate, ethyl acetate, n-propyl acetate, n-butyl acetate, methyl acetoacetate, ethyl acetoacetate, methyl pyruvate, ethyl pyruvate, N-methylpyrrolidone, N,N-dimethylformamide, N,N-dimethylacetamide, benzyl ethyl ether, di-n-hexyl ether, diethylene glycol monomethyl ether, diethylene glycol monoethyl ether, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, and the like can be given.

These solvents may be used either individually or in combination of two or more. Among these solvents, linear or branched ketones, cyclic ketones, propylene glycol monoalkyl ether acetates, alkyl 2-hydroxypropionates, alkyl 3-alkoxypropionates, and fluorine-containing solvents are preferable.

Formation of Resist Pattern

In the radiation-sensitive resin composition of the present invention, an acid is generated from the acid generator upon exposure to radiation. The acid-dissociable groups in the siloxane resin (A) or the fluorine-containing resin (B) dissociate by the action of the acid and generate a carboxyl group or hydroxyl group. As a result, solubility of the exposed part of the resist in an alkaline developer increases, whereby the exposed part is dissolved in an alkaline developer and removed to produce a positive-tone resist pattern.

A resist pattern is formed from the radiation-sensitive resin composition of the present invention by applying the composition solution to, for example, substrates such as a silicon wafer and a wafer coated with aluminum or substrates on which an under layer film has been formed in advance, using an appropriate application method such as rotational coating, cast coating, and roll coating to form a resist film. The resist film is then optionally pre-baked (hereinafter called "PB") and exposed to radiation to form a predetermined resist pattern. Deep ultraviolet rays such as $F_2$ excimer laser (wavelength: 157 nm), ArF excimer laser (wavelength: 193 nm), electron beams, X-rays, and the like are preferable as radiation used for exposure.

In the present invention, it is preferable to perform post-exposure bake (hereinafter called "PEB"). PEB ensures smooth dissociation of the acid-dissociable group in the siloxane resin (A) or fluorine-containing resin (B). The heating temperature for PEB is usually 30-200° C., and preferably 50-170° C., although the heating conditions vary depending on the composition of the resist. In order to bring out maximum potentiality of the radiation-sensitive resin composition of the present invention, an organic or inorganic under layer film may be formed on a substrate (Japanese Patent Publication 6-12452, for example). Moreover, a protection film may be formed on the resist film in order to prevent the effects of basic impurities and the like in an environmental atmosphere (Japanese Patent Application Laid-open No. 5-188598, for example). These techniques may be employed in combination.

The exposed resist film is then developed to form a specific resist pattern.

As examples of the developer used for development, alkaline aqueous solutions prepared by dissolving at least one of alkaline compounds such as sodium hydroxide, potassium hydroxide, sodium carbonate, sodium silicate, sodium metasilicate, aqueous ammonia, ethylamine, n-propylamine, diethylamine, di-n-propylamine, triethylamine, methyldiethylamine, ethyldimethylamine, triethanolamine, tetramethylammonium hydroxide, pyrrole, piperidine, choline, 1,8-diazabicyclo-[5.4.0]-7-undecene, and 1,5-diazabicyclo-[4.3.0]-5-nonene are preferable.

The concentration of the alkaline aqueous solution is usually 10 wt % or less. If the concentration of the alkaline aqueous solution exceeds 10 wt %, an unexposed part may be dissolved in the developer.

Organic solvents or the like may be added to the alkaline aqueous solution developer.

As examples of organic solvents, ketones such as acetone, 2-butanone, 4-methyl-2-pentanone, cyclopentanone, cyclohexanone, 3-methylcyclopentanone, and 2,6-dimethylcyclohexanone; alcohols such as methylalcohol, ethylalcohol, n-propylalcohol, i-propylalcohol, n-butylalcohol, t-butylalcohol, cyclopentanol, cyclohexanol, 1,4-hexanediol, and 1,4-hexanedimethylol; ethers such as tetrahydrofuran and dioxane; esters such as ethyl acetate, n-butyl acetate, and i-amyl acetate; aromatic hydrocarbons such as toluene and xylene; phenol, acetonylacetone, and dimethylformamide can be given.

These organic solvents may be used either individually or in combination of two or more.

The amount of the organic solvent to be used is preferably 100 vol % or less of the alkaline aqueous solution. The amount of the organic solvent exceeding 100 vol % may decrease developability, giving rise to a larger undeveloped portion in the exposed area.

In addition, surfactants or the like may be added to the alkaline aqueous solution developer in an appropriate amount.

After development using the alkaline aqueous solution developer, the resist film is generally washed with water and dried.

The radiation-sensitive resin composition of the present invention containing a siloxane resin (A) and a fluorine-containing resin (B) is particularly excellent in LER and exhibits high sensitivity. The resin composition is very useful as a chemically-amplified resist for microprocessing using radiation such as deep ultraviolet radiation, electron beams, and X-rays.

EXAMPLES

The present invention is described below in more detail by examples. However, these examples should not be construed as limiting the present invention. In the examples, part(s) refer to part(s) by weight.

Mw of the resins obtained in each Synthesis Example was measured in the following manner.

Mw:

Mw was measured by gel permeation chromatography (GPC) using GPC columns (manufactured by Tosoh Corp., G2000HXL×2, G3000HXL×1, G4000HXL×1) under the following conditions: Flow rate: 1.0 ml/minute, eluate: tetrahydrofuran, column temperature: 40° C., and standard reference material: monodispersed polystyrene.

Synthesis Example 1

Synthesis of Siloxane Resin (A))

A three-necked flask equipped with a stirrer, a reflux condenser, and a thermometer was charged with 36.3 g of the silane compound of the following formula (a-1), 41.3 g of the silane compound of the following formula (a-2) (hereinafter referred to as "silane compound (a-2)"), 22.4 g of methyltriethoxysilane, 100 g of 4-methyl-2-pentanone, and 23.0 g of a 1.75 wt % aqueous solution of oxalic acid. The mixture was reacted for six hours at 60° C. while stirring, followed by cooling with ice to terminate the reaction.

34.0 g of distilled water and 47.7 g of triethylamine were added to this reaction mixture and stirred for six hours at 80° C. in a nitrogen stream, followed by cooling with ice. An aqueous solution of 35.9 g of oxalic acid dissolved in 476.5 g of distilled water was added to the mixture, followed by further stirring. The reaction mixture was poured into a separating funnel to remove the water layer.

The organic layer was repeatedly washed with ion-exchanged water until the reaction solution became neutral. The solvent was evaporated from the organic layer under reduced pressure to obtain 62.1 g of a resin. Mw of the resin was measured and found to be 1,740. This resin is referred to as a "resin (A-1)".

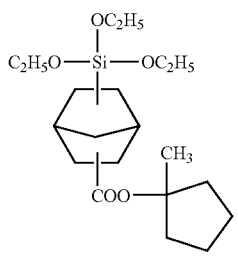

(a-1)

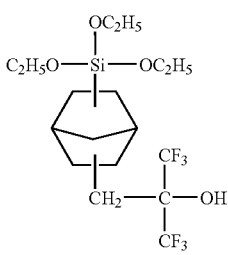

(a-2)

Synthesis Example 2

Synthesis of Siloxane Resin (A))

A three-necked flask equipped with a stirrer, a reflux condenser, and a thermometer was charged with 38.6 g of a silane compound of the following formula (a-3), 39.8 g of as silane compound (a-2), 21.6 g of methyltriethoxysilane, 100 g of 4-methyl-2-pentanone, and 22.2 g of a 1.75 wt % aqueous solution of oxalic acid. The mixture was reacted for six hours at 60° C. while stirring, followed by cooling with ice to terminate the reaction.

32.8 g of distilled water and 46.0 g of triethylamine were added to this reaction mixture and stirred for six hours at 80° C. in a nitrogen stream, followed by cooling with ice. An aqueous solution of 34.6 g of oxalic acid dissolved in 459.3 g of distilled water was added to the mixture, followed by further stirring. The reaction mixture was poured into a separating funnel to remove the water layer. The organic layer was repeatedly washed with ion-exchanged water until the reaction solution became neutral. The solvent was evaporated from the organic layer under reduced pressure to obtain 65.0 g of a resin. Mw of the resin was measured and found to be 1,900. This resin is referred to as a "resin (A-2)".

Synthesis Example 3

Fluorine-containing Resin (B))

A 500 ml three-necked flask was charged with 21.9 g (30 mol %) of 4-t-butoxystyrene and 78.1 g (70 mol %) of 4-[di(trifluoromethyl)(hydroxy)methyl]styrene. After adding 100 g of propylene glycol monomethyl ether to dissolve the 4-t-butoxystyrene and 4-[di(trifluoromethyl)(hydroxy) methyl]styrene, 2.71 g of azobisisobutyronitrile was added to the mixture. After purging with nitrogen for 30 minutes, the solution was heated at 70° C. for six hours while stirring to carry out polymerization and further heated at 95° C. for 30 minutes to continue polymerization. After polymerization, the reaction solution was cooled with water to 30° C. or less and poured into 1,000 g of n-heptane to cause the resin to precipitate. The obtained resin was filtered and washed twice with 400 g of n-heptane in a slurry state. The resin was filtered and dried at 60° C. for 17 hours to obtain 86.2 g (yield: 86.2 wt %) of a resin as a white powder.

The resin was found to be a copolymer having a Mw of 17,200 with the copolymerization molar ratio of 4-t-butoxystyrene and 4-[di(trifluoromethyl)(hydroxyl)methyl]styrene being 30.8:69.2. This resin is indicated as "resin (B-1)".

Synthesis Example 4

Fluorine-containing Resin (B))

Using a dropping funnel, a monomer solution was prepared by dissolving 16.7 g (30 mol %) of 1-methylcyclopentyl methacrylate and 83.3 g (70 mol %) of a compound of the following formula (b-1) (hereinafter referred to as "compound (b-1)") in 200 g of toluene, and further adding a solution of 7.60 g of methylazobisisovalerate dissolved in 150 g of 2-butanone.

A 500 ml three-necked flask containing 100 g of 2-butanone was purged with nitrogen for 30 minutes and heated to 80° C. while stirring. The monomer solution was dropped at a rate of 1.4 ml per minute and polymerization proceeded for five hours from the initiation of the dropping. Next, the reaction solution was cooled with water to 30° C. or less and poured into 2,000 g of n-heptane to cause the resin to precipitate. The obtained resin was filtered and washed twice with a slurry containing 400 g of n-heptane. The resin was filtered and dried at 60° C. for 17 hours to obtain 92.1 g (yield: 92.1 wt %) of a resin as a white powder.

The resin was found to be a copolymer having a Mw of 6,600 with the copolymerization molar ratio of 1-methylcyclopentyl methacrylate and the compound (b-1) being 30.2: 69.8. This resin is indicated as "resin (B-2)".

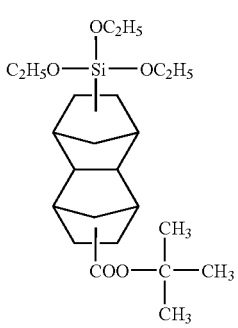

(a-3)

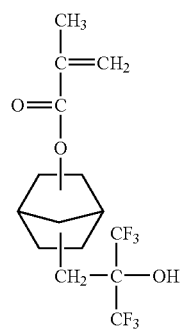

(b-1)

Preparation Example

Preparation of Under Layer Film-forming Composition

A separable flask equipped with a thermometer was charged with 100 parts of acenaphthylene, 78 parts of toluene, 52 parts of dioxane, and 3 parts of azobisisobutyronitrile under nitrogen atmosphere. The mixture was stirred for five hours at 70° C. Next, 5.2 parts of p-toluenesulfonic acid monohydrate and 40 parts of paraformaldehyde were added. After heating to 120° C., the mixture was stirred for six hours. The reaction solution was charged into a large amount of i-propyl alcohol. The resulting precipitate was collected by filtration and dried at 40° C. under reduced pressure to obtain a polymer having a Mw of 22,000.

10 parts of the obtained polymer, 0.5 part of bis(4-t-butylphenyl)iodonium 10-camphorsulfonate, and 0.5 part of 4,4'-[1-{4-(1-[4-hydroxyphenyl]-1-methylethyl)phenyl}ethylidene]bisphenol were dissolved in 89 parts of cyclohexanone. The solution was filtered using a membrane filter with a pore diameter of 0.1 μm to prepare an under layer film-forming composition.

Examples 1-4

Composition solutions were prepared by homogenously dissolving the siloxane resin (A), fluorine-containing resin (B), and the acid generator (C) shown in Table 1 along with 8 mol % of 2-phenylbenzimidazole for the total amount of the acid generator (C) in 900 parts of 2-heptanone.

Each composition solution was applied onto a silicon wafer substrate on which the under layer film (β-1) was previously formed by spin coating and pre-baked for 90 seconds on a hot plate at the temperatures shown in Table 1 to form resist films with a thickness of 1,500 Å.

The under layer film (β-1) used here was a film with a thickness of 3,000 Å prepared by applying the above-mentioned under layer film forming compositions onto a silicon wafer by spin coating and baked on a hot plate for 60 seconds at 180° C. and further baked for 120 seconds at 300° C.

Each resist film was exposed to an ArF excimer laser (wavelength: 193 nm, NA: 0.78, σ: 0.85). PEB of each resist film was conducted on a hot plate for 90 seconds at the temperatures indicated in Table 1. The resist films were developed using a 2.38 wt % tetramethylammonium hydroxide aqueous solution at 23° C. for 60 minutes, washed with water, and dried to form a positive-tone resist pattern. An optimum dose (Eop) at which a line-and-space (1L1S) pattern with a line width of 100 nm was formed was taken as sensitivity.

The LER when forming the line-and-space (1L1S) pattern with a line width of 100 nm at an optimum dose was measured using a Scanning Electron Microscope S9220 (manufactured by Hitachi High-Technologies Corporation). During this measurement, an image was taken at a magnification of 150,000, accelerating voltage of 300V, probe current of 8.0 pA, and frame rate of 32. Then, the image was processed in a 100 nm line automatic measuring mode, and variations in the 32 mean value obtained by an edge roughness measurement algorithm were calculated using a three-sigma method to obtain the LER measurement.

The evaluation results are shown in Table 1.

The acid generator (C) in Table 1 is as follows.
C-1: Triphenylsulfonium nonafluoro-n-butanesulfonate
C-2: Triphenylsulfonium 10-camphorsulfonate

TABLE 1

| | Siloxane resin (A) | Fluorine-containing resin (B) | Acid generator (C) | Temperature (° C.) | | Sensitivity (J/m$^2$) | LER (nm) |
|---|---|---|---|---|---|---|---|
| | | | | PB | PEB | | |
| Example 1 | A-1 (95) | B-1 (5) | C-1 (5.0) C-2 (1.5) | 140 | 100 | 360 | 5.5 |
| Example 2 | A-1 (95) | B-2 (5) | C-1 (5.0) C-2 (1.5) | 140 | 100 | 310 | 5.2 |
| Example 3 | A-2 (95) | B-1 (5) | C-1 (5.0) C-2 (1.5) | 100 | 80 | 350 | 6.0 |
| Example 4 | A-2 (95) | B-2 (5) | C-1 (5.0) C-2 (1.5) | 100 | 80 | 300 | 6.3 |
| Comparative Example 1 | A-1 (100) | — | C-1 (5.0) C-2 (1.5) | 140 | 100 | 380 | 8.8 |
| Comparative Example 2 | A-2 (100) | — | C-1 (5.0) C-2 (1.5) | 100 | 80 | 370 | 10.9 | units in parenthesis indicate parts by weight

The invention claimed is:

1. A radiation-sensitive resin composition comprising (A) a resin containing a structural unit of the following formula (I),

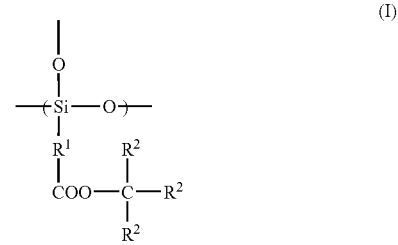

wherein $R^1$ represents a substituted or unsubstituted, linear or branched, divalent hydrocarbon group having 1-20 carbon atoms or a substituted or unsubstituted divalent alicyclic hydrocarbon group having 3-20 carbon atoms, $R^2$ individually represents a linear or branched alkyl group having 1-4 carbon atoms or a monovalent alicyclic hydrocarbon group having 4-20 carbon atoms or a substituted derivative thereof, or any two $R^2$s form in combination and together with the carbon atom to which the two $R^2$s bond a divalent alicyclic hydrocarbon group having 4-20 carbon atoms or a substituted derivative thereof, with the remaining $R^2$ being a linear or branched alkyl group having 1-4 carbon atoms or a monovalent alicyclic hydrocarbon group having 4-20 carbon atoms or a substituted derivative thereof, (B) a resin containing a recurring unit of the following formula (II),

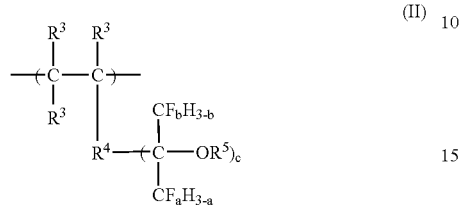

(II)

wherein $R^3$ individually represents a hydrogen atom, fluorine atom, methyl group, or a trifluoromethyl group, $R^4$ represents a linear or branched hydrocarbon group having 1-20 carbon atoms with a valence of (c+1), an alicyclic hydrocarbon group having 3-20 carbon atoms with a valence of (c+1), or an aromatic group having 6-20 carbon atoms with a valence of (c+1), or a group in which a —COO— group or —O— group is bonded to the linear or branched hydrocarbon group with a valence of (c+1), alicyclic hydrocarbon group with a valence of (c+1), or aromatic group with a valence of (c+1), provided that the carbonyl group in the —COO— group bonds to the main chain carbon atom in the formula (II), the linear or branched hydrocarbon group with a valence of (c+1), alicyclic hydrocarbon group with a valence of (c+1), or aromatic group with a valence of (c+1) being either substituted or unsubstituted, $R^5$ represents a hydrogen atom or a monovalent acid-dissociable group, a and b individually represent an integer of 0-3, provided that a and b satisfy the inequality of (a+b)≧1, and c is an integer of 1-3, (C) a photoacid generator.

2. The radiation-sensitive resin composition according to claim 1, wherein $R^1$ in the formula (1) representing a structural unit in the resin is a group derived from bicyclo [2.2.]heptane or tetracyclo[6.2.1.1$^{3,6}$.0$^{2,7}$]dodecane.

3. The radiation-sensitive resin composition according to claim 1, wherein the structure for the group $C(R^2)_3$ in the formula (I) representing a structural unit in the resin is one or more groups selected from the group consisting of a trialkylmethyl group, 1-alkylcycloalkyl group, alkyl-substituted bridged hydrocarbon group, or alkyl-substituted bridged hydrocarbon-group substituted methyl group.

4. The radiation-sensitive resin composition according to claim 1, wherein $R^4$ in the formula (II) representing a structural unit in the resin is a group with a valence of (c+1) derived from methane, benzene, cyclohexane, or carboxybicyclo[2.2.1]heptane.

5. The radiation-sensitive resin composition according to claim 1, wherein $R^5$ in the formula (II) representing a structural unit in the resin is a hydrogen atom, t-butoxycarbonyl group, methoxymethyl group, or ethoxymethyl group.

6. The radiation-sensitive resin composition according to claim 1, wherein the resin of the component (A) further contains a structural unit of the following formula (III) and/or a structural unit of the following formula (IV),

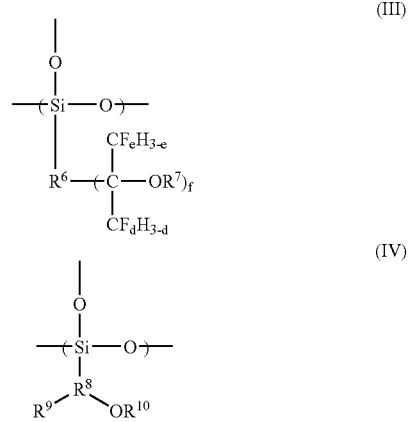

wherein $R^6$ represents a substituted or unsubstituted, linear or branched hydrocarbon group having 1-20 carbon atoms with a valence of (f+1) or a substituted or unsubstituted alicyclic hydrocarbon group having 3-20 carbon atoms with a valence of (f+1), $R^7$ represents a hydrogen atom or a monovalent acid-dissociable group, d and e individually represent an integer of 0-3, provided that d and e satisfy the inequality of (d+e)≧1, f is an integer of 1-3, $R^8$ represents a substituted or unsubstituted trivalent alicyclic hydrocarbon group having 3-20 carbon atoms or a substituted or unsubstituted trivalent heterocyclic group having 3-20 atoms, $R^9$ represents a hydrogen atom, fluorine atom, a linear or branched alkyl group having 1-4 carbon atoms, or a linear or branched fluoroalkyl group having 1-4 carbon atoms, and $R^{10}$ represents a hydrogen atom or a monovalent acid-dissociable group.

7. The radiation-sensitive resin composition according to claim 6, wherein the resin of the component (A) further contains a structural unit of the formula (III).

8. The radiation-sensitive resin composition according to claim 7, wherein $R^6$ in the formula (III) representing a structural unit is a group derived from cyclohexane, bicyclo [2.2.1]heptane, or tetracyclo[6.2.1.1$^{3,6}$.0$^{2,7}$]dodecane and $R^7$ is a hydrogen atom, t-butoxycarbonyl group, methoxymethyl group, or ethoxymethyl group.

9. The radiation-sensitive resin composition according to claim 1, wherein the resin of the component (B) further contains a recurring unit of the following formula (V) and/or a recurring unit of the following formula (VI),

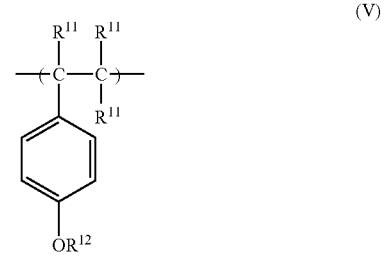

(V)

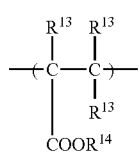
(VI)

wherein $R^{11}$ individually represents a hydrogen atom, fluorine atom, methyl group, or trifluoromethyl group, $R^{12}$ represents a hydrogen atom or a monovalent acid-dissociable group, $R^{13}$ individually represents a hydrogen atom, fluorine atom, or trifluoromethyl group, and $R^{14}$ represents a hydrogen atom or a monovalent acid-dissociable group.

10. The radiation-sensitive resin composition according to claim 1, wherein the acid generator (C) comprises a compound generating trifluoromethane sulfonic acid or an acid of the following formula (3),

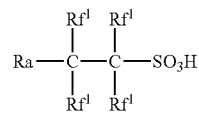
(3)

upon exposure to light, wherein $Rf^1$ individually represents a fluorine atom or a trifluoromethyl group and Ra represents a hydrogen atom, a fluorine atom, a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

11. The radiation-sensitive resin composition according to claim 10, wherein the acid generator (C) further comprises a compound generating an acid of the following formula (4), an acid of the following formula (5), or an acid of the following formula (6),

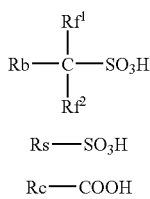
(4)

(5)

(6)

upon exposure to light, wherein $Rf^1$ represents a fluorine atom or a trifluoromethyl group, $Rf^2$ represents a hydrogen atom, fluorine atom, methyl group, or trifluoromethyl group, Rb represents a hydrogen atom, a linear or branched alkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms, Rs represents a linear or branched alkyl group having 1-20 carbon atoms or a substituted or unsubstituted monovalent cyclic hydrocarbon group having 3-20 carbon atoms, and Rc represents a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluorohydrocarbon group having 3-20 carbon atoms.

12. The radiation-sensitive resin composition according to claim 2, wherein the acid generator (C) comprises a compound generating trifluoromethane sulfonic acid or an acid of the following formula (3),

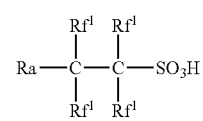
(3)

upon exposure to light, wherein $Rf^1$ individually represents a fluorine atom or a trifluoromethyl group and Ra represents a hydrogen atom, a fluorine atom, a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

13. The radiation-sensitive resin composition according to claim 12, wherein the acid generator (C) further comprises a compound generating an acid of the following formula (4), an acid of the following formula (5), or an acid of the following formula (6),

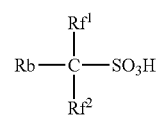
(4)

(5)

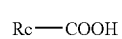
(6)

upon exposure to light, wherein $Rf^1$ represents a fluorine atom or a trifluoromethyl group, $Rf^2$ represents a hydrogen atom, fluorine atom, methyl group, or trifluoromethyl group, Rb represents a hydrogen atom, a linear or branched alkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms, Rs represents a linear or branched alkyl group having 1-20 carbon atoms or a substituted or unsubstituted monovalent cyclic hydrocarbon group having 3-20 carbon atoms, and Rc represents a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluorohydrocarbon group having 3-20 carbon atoms.

14. The radiation-sensitive resin composition according to claim 4, wherein the acid generator (C) comprises a compound generating trifluoromethane sulfonic acid or an acid of the following formula (3),

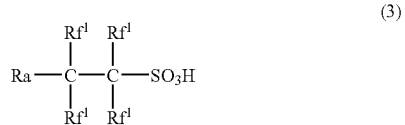

upon exposure to light, wherein $Rf^1$ individually represents a fluorine atom or a trifluoromethyl group and Ra represents a hydrogen atom, a fluorine atom, a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

15. The radiation-sensitive resin composition according to claim 14, wherein the acid generator (C) further comprises a compound generating an acid of the following formula (4), an acid of the following formula (5), or an acid of the following formula (6),

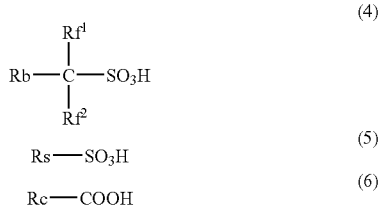

upon exposure to light, wherein $Rf^1$ represents a fluorine atom or a trifluoromethyl group, $Rf^2$ represents a hydrogen atom, fluorine atom, methyl group, or trifluoromethyl group, Rb represents a hydrogen atom, a linear or branched alkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms, Rs represents a linear or branched alkyl group having 1-20 carbon atoms or a substituted or unsubstituted monovalent cyclic hydrocarbon group having 3-20 carbon atoms, and Rc represents a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

16. The radiation-sensitive resin composition according to claim 5, wherein the acid generator (C) comprises a compound generating trifluoromethane sulfonic acid or an acid of the following formula (3),

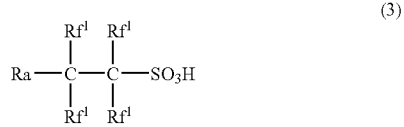

upon exposure to light, wherein $Rf^1$ individually represents a fluorine atom or a trifluoromethyl group and Ra represents a hydrogen atom, a fluorine atom, a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

17. The radiation-sensitive resin composition according to claim 16, wherein the acid generator (C) further comprises a compound generating an acid of the following formula (4), an acid of the following formula (5), or an acid of the following formula (6),

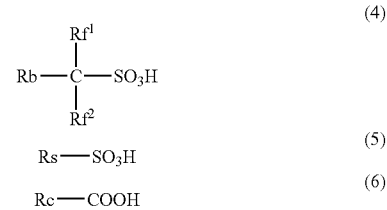

upon exposure to light, wherein $Rf^1$ represents a fluorine atom or a trifluoromethyl group, $Rf^2$ represents a hydrogen atom, fluorine atom, methyl group, or trifluoromethyl group, Rb represents a hydrogen atom, a linear or branched alkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms, Rs represents a linear or branched alkyl group having 1-20 carbon atoms or a substituted or unsubstituted monovalent cyclic hydrocarbon group having 3-20 carbon atoms, and Rc represents a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

18. The radiation-sensitive resin composition according to claim 8, wherein the acid generator (C) comprises a compound generating trifluoromethane sulfonic acid or an acid of the following formula (3),

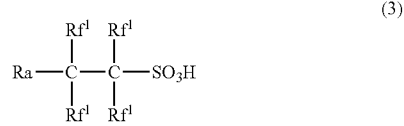

upon exposure to light, wherein RP individually represents a fluorine atom or a trifluoromethyl group and Ra represents a hydrogen atom, a fluorine atom, a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

19. The radiation-sensitive resin composition according to claim 18, wherein the acid generator (C) further comprises a compound generating an acid of the following formula (4), an acid of the following formula (5), or an acid of the following formula (6),

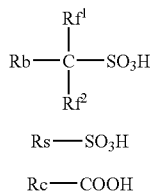
(4)

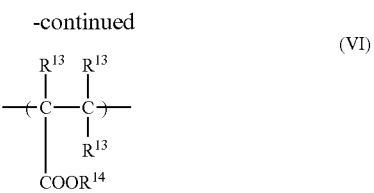

upon exposure to light, wherein $Rf^1$ represents a fluorine atom or a trifluoromethyl group, $Rf^2$ represents a hydrogen atom, fluorine atom, methyl group, or trifluoromethyl group, Rb represents a hydrogen atom, a linear or branched alkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms, Rs represents a linear or branched alkyl group having 1-20 carbon atoms or a substituted or unsubstituted monovalent cyclic hydrocarbon group having 3-20 carbon atoms, and Rc represents a linear or branched alkyl group having 1-20 carbon atoms, a linear or branched fluoroalkyl group having 1-20 carbon atoms, a substituted or unsubstituted monovalent cyclic hydrocarbon group having 3-20 carbon atoms, or a substituted or unsubstituted monovalent cyclic fluoro-hydrocarbon group having 3-20 carbon atoms.

20. The radiation-sensitive resin composition according to claim 2, wherein the resin of the component (B) further contains a recurring unit of the following formula (V) and/or a recurring unit of the following formula (VI),

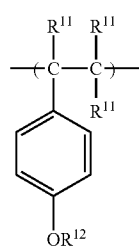

wherein $R^{11}$ individually represents a hydrogen atom, fluorine atom, methyl group, or trifluoromethyl group, $R^{12}$ represents a hydrogen atom or a monovalent acid-dissociable group, $R^{13}$ individually represents a hydrogen atom, fluorine atom, or trifluoromethyl group, and $R^{14}$ represents a hydrogen atom or a monovalent acid-dissociable group.

21. The radiation-sensitive resin composition according to claim 1, wherein the amount of the recurring unit (II) in the resin (B) is 100 mol %.

22. The radiation-sensitive resin composition according to claim 9, wherein the resin (B) consists of one or more recurring units of the formula (II) and one or more recurring units of the formulae (V) and/or (VI).

23. The radiation-sensitive resin composition according to claim 22, wherein the amount of the recurring unit (II) in the resin (B) is 5-95 mol % and the amount of the one or more recurring units of the formulae (V) and/or (VI) is 5-95 mol %.

24. The radiation-sensitive resin composition according to claim 1, wherein the resin (B) consists of one or more recurring units of the formula (II) and one or more other recurring units obtained by cleavage of the polymerizable unsaturated bond of a compound selected from the group consisting of a vinyl aromatic compound, a (meth)acrylate, a hydroxyalkyl ester of an unsaturated carboxylic acid, a carboxylalkyl ester of an unsaturated carboxylic acid, an unsaturated carboxylic acid or anhydride, an unsaturated nitryl compound, an unsaturated amide compound, an unsaturated imide compound and a nitrogen-containing vinyl compound.

25. The radiation-sensitive resin composition according to claim 24 wherein the nitrogen-containing vinyl compound is selected from the group consisting of N-vinyl-ε-caprolactam, N-vinylpyrrolidone, 2-vinylpyridine, 3-vinylpyridine, 4-vinylpyridine, 2-vinylimidazole, and 4-vinylimidazole.

26. The radiation-sensitive resin composition according to claim 24, wherein the amount of the recurring unit (LI) in the resin (B) is 5-100 mol % and the amount of the one or more other recurring units in the resin (B) is 95 mol % or less.

* * * * *